(12) United States Patent
Huang

(10) Patent No.: US 10,148,462 B2
(45) Date of Patent: Dec. 4, 2018

(54) MULTIPLE-INPUT MULTIPLE-OUTPUT ORTHOGONAL FREQUENCY DIVISION MULTIPLEXING COMMUNICATION SYSTEM AND METHOD FOR SIGNAL COMPENSATION

(71) Applicant: Huawei Technologies Co., Ltd., Shenzhen (CN)

(72) Inventor: Huang Huang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/432,711

(22) Filed: Feb. 14, 2017

(65) Prior Publication Data

US 2017/0163448 A1    Jun. 8, 2017

Related U.S. Application Data

(63) Continuation of application No. 14/941,839, filed on Nov. 16, 2015, now Pat. No. 9,608,843, which is a
(Continued)

(30) Foreign Application Priority Data

May 16, 2013    (CN) .......................... 2013 1 0181256

(51) Int. Cl.
*H04W 84/12*    (2009.01)
*H04L 25/02*    (2006.01)
(Continued)

(52) U.S. Cl.
CPC ....... *H04L 25/0204* (2013.01); *H04B 7/0413* (2013.01); *H04B 7/0615* (2013.01);
(Continued)

(58) Field of Classification Search
USPC .......................... 375/224, 260; 370/329, 203
See application file for complete search history.

(56) References Cited

U.S. PATENT DOCUMENTS 7,058,002 B1 *  6/2006  Kumagai ............ H04L 27/2662
                                                           370/203
7,313,194 B2    12/2007  Bar-Ness et al.
(Continued)

FOREIGN PATENT DOCUMENTS

CN    1825841 A    8/2006
CN    1961499 A    5/2007
(Continued)

OTHER PUBLICATIONS

Zou et al., "Compensation of Phase Noise in OFDM Wireless Systems," IEEE Transactions on Signal Processing, vol. 55, Issue 11, pp. 5407-5424, Institute of Electrical and Electronics Engineers, New York, New York (Nov. 2007).
(Continued)

*Primary Examiner* — Eva Puente
(74) *Attorney, Agent, or Firm* — Leydig, Voit & Mayer, Ltd.

(57) ABSTRACT

Embodiments of the present disclosure provide a method for signal compensation, including: receiving, by a receiver via N receiving antennas, a plurality of channel estimation preamble signals sent by M transmitting antennas of a remote transmitter; determining, by the receiver, channel estimation parameters according to the first pilot signals of the M transmitting antennas contained in the plurality of channel estimation preamble signals; receiving, by the receiver, data signals and second pilot signals sent on a first data symbol by the M transmitting antennas; determining, by the receiver, channel phase shift parameters according to signals arrived at the N receiving antennas which come from the second pilot signals; and determining, by the receiver
(Continued)

according to the channel estimation parameters and the channel phase shift parameters, signal compensation for the data signals arrived at the N receiving antennas. Accuracy of demodulation for transmitted data to a certain extent is improved.

2 Claims, 9 Drawing Sheets

Related U.S. Application Data continuation of application No. PCT/CN2013/090338, filed on Dec. 24, 2013.

(51) Int. Cl.
*H04B 7/0413* (2017.01)
*H04L 5/00* (2006.01)
*H04L 27/26* (2006.01)
*H04B 7/06* (2006.01)
*H04L 27/00* (2006.01)

(52) U.S. Cl.
CPC ........ *H04L 5/0007* (2013.01); *H04L 25/0224* (2013.01); *H04L 25/0228* (2013.01); *H04L 27/261* (2013.01); *H04L 27/2647* (2013.01); *H04L 2027/003* (2013.01)

(56) References Cited

U.S. PATENT DOCUMENTS

| | | | |
|---|---|---|---|
| 7,564,917 B2 | 7/2009 | Mitran | |
| 8,023,583 B2 | 9/2011 | Bar-Ness et al. | |
| 8,982,822 B2* | 3/2015 | Ogawa | H04L 5/001 370/329 |
| 9,385,907 B2* | 7/2016 | bin Mohd Yussof | H04L 27/2628 |
| 2003/0026295 A1 | 2/2003 | Baum et al. | |
| 2004/0233838 A1 | 11/2004 | Sudo et al. | |
| 2006/0193392 A1 | 8/2006 | Kim et al. | |
| 2006/0221808 A1* | 10/2006 | Shirakata | H04B 7/0848 370/203 |
| 2006/0262868 A1 | 11/2006 | Leshem | |
| 2007/0133659 A1 | 6/2007 | Deng et al. | |
| 2007/0147527 A1 | 6/2007 | Egaskra et al. | |
| 2007/0153927 A1 | 7/2007 | Ma et al. | |
| 2009/0175367 A1 | 7/2009 | Kishigami et al. | |
| 2009/0190686 A1 | 7/2009 | Cheong et al. | |
| 2009/0257411 A1* | 10/2009 | Shitara | H04J 11/0069 370/336 |
| 2009/0323515 A1 | 12/2009 | Ishikura et al. | |
| 2010/0015922 A1 | 1/2010 | Kawai | |
| 2010/0260248 A1* | 10/2010 | Hung | H04L 25/0212 375/224 |
| 2010/0329374 A1* | 12/2010 | Pi | H04L 5/0007 375/260 |
| 2011/0064167 A1 | 3/2011 | Rezk et al. | |
| 2011/0149893 A1* | 6/2011 | Park | H04L 5/0023 370/329 |
| 2012/0051476 A1 | 3/2012 | Shi et al. | |
| 2013/0089123 A1 | 4/2013 | Rahul et al. | |
| 2013/0177095 A1 | 7/2013 | Sun et al. | |
| 2014/0219390 A1 | 8/2014 | Imamura et al. | |
| 2014/0286463 A1 | 9/2014 | Reingold | |
| 2015/0236832 A1 | 8/2015 | Murakami et al. | |
| 2017/0126301 A1 | 5/2017 | Taherzadehboroujeni et al. | |

FOREIGN PATENT DOCUMENTS

| | | |
|---|---|---|
| CN | 101076001 A | 11/2007 |
| CN | 101267422 A | 9/2008 |
| CN | 101361307 A | 2/2009 |
| CN | 101601200 A | 12/2009 |
| CN | 102005643 A | 4/2011 |
| CN | 102082744 A | 6/2011 |
| EP | 1971061 A1 | 9/2008 |
| EP | 2045942 A1 | 4/2009 |
| JP | 3735080 B2 | 1/2006 |
| JP | 2007515861 A | 6/2007 |
| JP | 2007208967 A | 8/2007 |
| KR | 100895049 B1 | 4/2009 |
| WO | 2005046113 A2 | 5/2005 |
| WO | 2005088882 A1 | 9/2005 |
| WO | 2008010549 A1 | 1/2008 |
| WO | 2010148670 A1 | 12/2010 |

OTHER PUBLICATIONS

Pollet et al., "Effect of carrier phase jitter on single-carrier and multi-carrier QAM systems," IEEE International Conference on Communications, pp. 1046-1050, Institute ofElectrical and Electronics Engineers, New York, New York (1995).

Bittner et al, "Exploiting Phase Noise Properties in the Design of MIMO-OFDM Receivers," IEEE Wireless Communications and Networking Conference, pp. 940-945,Institute of Electrical and Electronics Engineers, New York, New York (2008).

Andrews et al., "Fundamentals of WiMAX; Understanding Broadband Wireless Networking," Prentice Hall Communications Engineering and Emerging TechnologiesSeries, Pearson Education, Upper Saddle River, New Jersey (2007).

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Draft 802.11-REVmb/D9.0, pp. i-2622, Institute of Electrical and Electronics Engineers, New York, New York (May 2011).

Corvaja et al., "Joint Channel and Phase Noise Compensation for OFDM in Fast-Fading Multipath Applications," IEEE Transactions on Vehicular Technology, vol. 58,Issue 2, pp. 636-643, Institute of Electrical and Electronics Engineers, New York, NewYork (Feb. 2009).

Zelst, "MIMO OFDM for Wireless LANs," Eindhoven University of Technoiogy,Eindhoven, Netherlands (Apr. 14, 2004).

Syrjala et al., "Phase Noise Modelling and Mitigation Techniques in OFDM Communications Systems," Wireless Telecommunications Symposium, Institute of Electrical and Electronics Engineers, New York, New York (2009).

Paul et al., "Wireless LAN Comes of Age: Understanding the IEEE 802.11nArnendment," IEEE Circuits and Systems Magazine, First Quarter, Institute of Electricaland Electronics Engineers, New York, New York (2008).

JP 2017-158216, Office Action, dated May 7, 2018.
U.S. Appl. No. 14/941,839, filed Nov. 16, 2015.

* cited by examiner

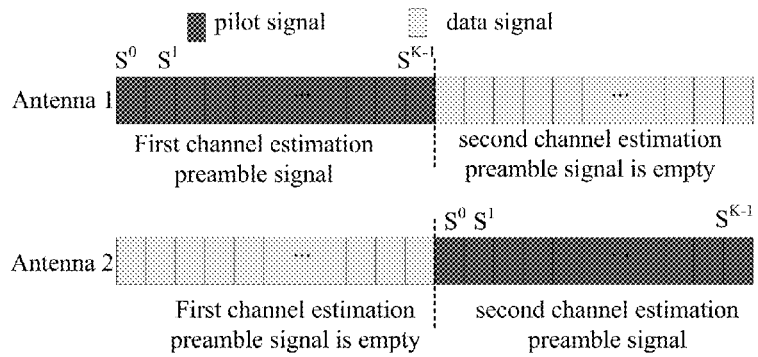

FIG. 11 the transmitter sends, via M transmitting antennas, a plurality of channel estimation preamble signals to N receiving antennas of a remote receiver, wherein the plurality of channel estimation preamble signals contain first pilot signals of the M transmitting antennas, where M and N are integers larger than 1. The first pilot signals in the plurality of channel estimation preamble signals are used by the remote receiver for determining channel estimation parameters from the M transmitting antennas to the N receiving antennas, and each one of the plurality of channel estimation preamble signals is seperately transmitted by one transmitting antenna in the M transmitting antennas ⌒ 1201 the transmitter sends, via the M transmitting antennas, data signals and second pilot signals on a data symbol, wherein the second pilot signals are used by the remote receiver for determining channel phase shift parameters from the M transmitting antennas to the N receiving antennas, and further determining signal compensation of the data signals according to the channel estimation parameters and the channel phase shift parameters ⌒ 1202

FIG. 12

MULTIPLE-INPUT MULTIPLE-OUTPUT ORTHOGONAL FREQUENCY DIVISION MULTIPLEXING COMMUNICATION SYSTEM AND METHOD FOR SIGNAL COMPENSATION

CROSS-REFERENCE TO RELATED APPLICATIONS

This application is a continuation of U.S. patent application Ser. No. 14/941,839, filed Nov. 16, 2015, which is a continuation of International Patent Application No. PCT/CN2013/090338, filed on Dec. 24, 2013, which claims priority to Chinese Patent Application No. 201310181256.2, filed on May 16, 2013, all of which are hereby incorporated by reference in their entireties.

TECHNICAL FIELD

Embodiments of the present disclosure relate to the field of communications, and more particularly, to a multiple-input multiple-output orthogonal frequency division multiplexing communication system and a method for signal compensation.

BACKGROUND

Future broadband wireless communication systems will meet a variety of integrated service needs from voice to multimedia under a premise of high stability and high data transmission rate. To implement fast transmission of integrated service contents on limited spectrum resource, a technology with very high spectrum efficiency is needed. Multiple-input multiple-output (MIMO) technology fully develops space resource, and implements multiple inputs and multiple outputs by use of a plurality of antennas, and channel capacity may be increased by times without a need of adding spectrum resource or antenna transmission power. Orthogonal frequency division multiplexing (OFDM) technology is one of multicarrier narrowband transmissions, and subcarriers thereof are mutually orthogonal, and thus may utilize spectrum resources effectively. An effective combination of the two (MIMO-OFDM) may overcome an adverse influence caused by a multipath effect and frequency selective fading, realize high reliability of signal transmission, and may further increase system capacity and improve spectrum efficiency.

However, an MIMO-OFDM system is easily to be affected by phase noise and frequency offset.

SUMMARY

Embodiments of the present disclosure provide a multiple-input multiple-output orthogonal frequency division multiplexing communication system and a method for signal compensation, which can improve demodulation accuracy of transmitted data to a certain extent.

In a first aspect, a method for signal compensation is provided. The method includes: receiving, by a receiver via N receiving antennas, a plurality of channel estimation preamble signals sent by M transmitting antennas of a remote transmitter, wherein the plurality of channel estimation preamble signals contain first pilot signals of the M transmitting antennas, and M and N are integers larger than 1; determining, by the receiver, channel estimation parameters from the M transmitting antennas to the N receiving antennas according to the first pilot signals of the M transmitting antennas contained in the plurality of channel estimation preamble signals; receiving, by the receiver via the N receiving antennas, data signals and second pilot signals sent on a first data symbol by the M transmitting antennas; determining, by the receiver, channel phase shift parameters from the M transmitting antennas to the N receiving antennas according to signals arrived at the N receiving antennas which come from the second pilot signals sent on the first data symbol by the M transmitting antennas; and determining, by the receiver according to the channel estimation parameters from the M transmitting antennas to the N receiving antennas and the channel phase shift parameters from the M transmitting antennas to the N receiving antennas, signal compensation for the data signals arrived at the N receiving antennas that are sent on the first data symbol by the M transmitting antennas.

In combination with the first aspect, in a first possible implementation manner, it is specifically implemented as follows: a subcarrier set for sending a first pilot signal of the $m^{th}$ transmitting antenna in the M transmitting antennas is equal to a set of subcarriers of the $m^{th}$ transmitting antenna, $\forall m=\{1, \ldots, M\}$.

In combination with the first aspect or the first possible implementation manner of the first aspect, in a second possible implementation manner, it is specifically implemented as follows: the N receiving antennas are coherent, and the M transmitting antennas are coherent.

In combination with the second possible implementation manner of the first aspect, in a third possible implementation manner, the determining, by the receiver, channel phase shift parameters from the M transmitting antennas to the N receiving antennas according to signals arrived at the N receiving antennas which come from the second pilot signals sent on the first data symbol by the M transmitting antennas, includes: determining, by the receiver according to a signal arrived at the N receiving antennas which comes from a second pilot signal sent on the first data symbol by the $m^{th}$ transmitting antenna in the M transmitting antennas, channel phase shift parameters from the $m^{th}$ transmitting antenna in the M transmitting antennas to the N receiving antennas, wherein $\forall m=\{1, \ldots, M\}$.

In combination with the third possible implementation manner of the first aspect, in a fourth possible implementation manner, the determining, by the receiver according to the signal arrived at the N receiving antennas which comes from the second pilot signal sent on the first data symbol by the $m^{th}$ transmitting antenna in the M transmitting antennas, channel phase shift parameters from the $m^{th}$ transmitting antenna in the M transmitting antennas to the N receiving antennas, includes: if there is more than one subcarrier on the first data symbol for sending the second pilot signal, determining, by the receiver according to signals arrived at the N receiving antennas which come from the second pilot signals sent on a plurality of subcarriers of the first data symbol by the $m^{th}$ transmitting antenna in the M transmitting antennas, multiple groups of channel phase shift parameters from the $m^{th}$ transmitting antenna in the M transmitting antennas to the N receiving antennas, and determining average values of the multiple groups of channel phase shift parameters as the channel phase shift parameters from the $m^{th}$ transmitting antenna in the M transmitting antennas to the N receiving antennas.

In combination with the third possible implementation manner of the first aspect or the fourth possible implementation manner of the first aspect, in a fifth possible implementation manner, it is specifically implemented as follows: the determining, by the receiver according to the channel estimation parameters from the M transmitting antennas to the N receiving antennas and the channel phase shift parameters from the M transmitting antennas to the N receiving antennas, the signal compensation for the data signals arrived at the N receiving antennas that are sent on the first data symbol by the M transmitting antennas, is expressed by the following formula:

$$\begin{bmatrix} \hat{x}_1^k \\ \vdots \\ \hat{x}_M^k \end{bmatrix} = \begin{bmatrix} e^{-j\theta_{k_1,l}} & \cdots & 0 \\ \vdots & \vdots & \vdots \\ 0 & \cdots & e^{-j\theta_{k_M,l}} \end{bmatrix} \left[ [\hat{H}^k]^{\dagger} \hat{H}^k \right]^{-1} [\hat{H}^k]^{\dagger} \begin{bmatrix} y_1^k(l) \\ \vdots \\ y_N^k(l) \end{bmatrix}$$

wherein $\hat{x}_m^k$ represents a data signal transmitted on the $k^{th}$ subcarrier of the $l^{th}$ data symbol by the $m^{th}$ transmitting antenna in the M transmitting antennas, $y_n^k(l)$ represents arrived at the $n^{th}$ receiving antenna of the receiver which comes from a data signal transmitted on the $k^{th}$ subcarrier of the $l^{th}$ data symbol by the M transmitting antennas, $\forall m=\{1,\ldots,M\}$, $\forall n=\{1,\ldots,N\}$, $\hat{H}^k$ represents a channel estimation parameter matrix on the $k^{th}$ subcarrier between the M transmitting antennas and the N receiving antennas, $[\hat{H}^k]^{\dagger}$ represents a conjugate matrix of $\hat{H}^k$, $\hat{H}_{nm}^k$ in $\hat{H}^k$ represents a channel estimation parameter on the $k^{th}$ subcarrier between the $m^{th}$ transmitting antenna of the remote transmitter and the $n^{th}$ receiving antenna of the receiver, $\hat{H}_{nm}^k = y_n^k(t)/s^k$, $\forall n=\{1,\ldots,N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $$\begin{bmatrix} e^{j\theta_{k_1,l}} \\ \vdots \\ e^{j\theta_{k_M,l}} \end{bmatrix}$$

represents channel phase shift parameters for signals arrived at the N receiving antennas which are sent on the $k^{th}$ subcarrier of the $l^{th}$ data symbol by the M transmitting antennas, and is expressed by the following formula:

$$\begin{bmatrix} e^{j\theta_{k_1,l}} \\ \vdots \\ e^{j\theta_{k_M,l}} \end{bmatrix} = \begin{bmatrix} s_1^k & \cdots & 0 \\ \vdots & \vdots & \vdots \\ 0 & \cdots & s_M^k \end{bmatrix} \left[ [\hat{H}^k]^{\dagger} \hat{H}^k \right]^{-1} [\hat{H}^k]^{\dagger} \begin{bmatrix} y_1^k(l) \\ \vdots \\ y_N^k(l) \end{bmatrix}$$

wherein $s_m^k$ represents a pilot signal transmitted on the $k^{th}$ subcarrier by the $m^{th}$ transmitting antenna of the remote transmitter, $y_n^k(l)$ represents a pilot signal arrived at the $n^{th}$ receiving antenna of the receiver which comes from a pilot signal sent on the $k^{th}$ subcarrier of the $l^{th}$ data symbol by the M transmitting antennas, and $e$ represents a channel phase shift parameter for the signal arrived at the N receiving antennas that is sent on the $k^{th}$ subcarrier of the $l^{th}$ data symbol by the $m^{th}$ transmitting antenna of the remote transmitter.

In combination with the first aspect or the first possible implementation manner of the first aspect, in a sixth possible implementation manner, it is specifically implemented as follows: the N receiving antennas are incoherent, and/or the M transmitting antennas are incoherent.

In combination with the sixth possible implementation manner of the first aspect, in a seventh possible implementation manner, the determining, by the receiver, channel phase shift parameters from the M transmitting antennas to the N receiving antennas according to signals arrived at the N receiving antennas which come from the second pilot signals sent on the first data symbol by the M transmitting antennas, includes:

determining, by the receiver, the channel phase shift parameters from the M transmitting antennas to the N receiving antennas according to all of pilot signals arrived at the N receiving antennas that come from the second pilot signals sent on the first data symbol by the M transmitting antennas, wherein a quantity of pilot subcarriers where all of the pilot signals are located is not smaller than M.

In combination with the seventh possible implementation manner of the first aspect, in an eighth possible implementation manner, it is specifically implemented as follows: the determining, by the receiver according to the channel estimation parameters from the M transmitting antennas to the N receiving antennas and the channel phase shift parameters from the M transmitting antennas to the N receiving antennas, the signal compensation for the data signals arrived at the N receiving antennas that are sent on the first data symbol by the M transmitting antennas, is expressed by the following formula:

$$\begin{bmatrix} \hat{x}_1^k \\ \vdots \\ \hat{x}_M^k \end{bmatrix} = \left[ [H_\xi^k]^{\dagger} H_\xi^k \right]^{-1} [H_\xi^k]^{\dagger} \begin{bmatrix} y_1^k(l) \\ \vdots \\ y_N^k(l) \end{bmatrix}$$

wherein $\hat{x}_m^k$ represents a data signal transmitted on the $k^{th}$ subcarrier of the $l^{th}$ data symbol by the $m^{th}$ transmitting antenna in the M transmitting antennas, $y_n^k(l)$ represents arrived at the $n^{th}$ receiving antenna of the receiver which comes from a data signal transmitted on the $k^{th}$ subcarrier of the $l^{th}$ data symbol by the M transmitting antennas, $\forall m=\{1,\ldots,M\}$, $\forall n=\{1,\ldots,N\}$, $[H_\xi^k]^{\dagger}$ represents a conjugate matrix of $H_\xi^k$, $$H_\xi^k = \begin{bmatrix} \hat{H}_{11}^k e^{j\xi_{11}} & \cdots & \hat{H}_{1M}^k e^{j\xi_{1M}} \\ \vdots & \vdots & \vdots \\ \hat{H}_{N1}^k e^{j\xi_{N1}} & \cdots & \hat{H}_{NM}^k e^{j\xi_{NM}} \end{bmatrix},$$

$\hat{H}_{nm}^k$ in $H_\xi^k$ represents a channel estimation parameter on the $k^{th}$ subcarrier between the $m^{th}$ transmitting antenna of the remote transmitter and the $n^{th}$ receiving antenna of the receiver, $\hat{H}_{nm}^k = y_n^k(t)/s^k$, $\forall n=\{1,\ldots,N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix}$$

represents channel phase shift parameters for signals arrived at the N receiving antennas that are sent on the 1th data symbol by the M transmitting antennas, and is expressed by the following formula:

$$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix} = \begin{bmatrix} \tilde{H}^{P1} \\ \vdots \\ \tilde{H}^{P_{|P|}} \end{bmatrix}^\dagger \begin{bmatrix} \begin{bmatrix} \tilde{H}^{P1} \\ \vdots \\ \tilde{H}^{P_{|P|}} \end{bmatrix} \end{bmatrix}^{-1} \begin{bmatrix} \tilde{H}^{P1} \\ \vdots \\ \tilde{H}^{P_{|P|}} \end{bmatrix}^\dagger \begin{bmatrix} y_1^{P1}(l) \\ \vdots \\ y_N^{P1}(l) \\ y_1^{P2}(l) \\ \vdots \\ y_N^{P_{|P|}}(l) \end{bmatrix}$$

wherein $y_n^p(l)$ represents a pilot signal arrived at the N receiving antennas which comes from a pilot signal transmitted on a pilot subcarrier p of the $l^{th}$ data symbol by the M transmitting antennas, p represents any pilot subcarrier in a pilot subcarrier set $\{p_1, \ldots p_{|P|}\}$ of the $l^{th}$ data symbol, and $\hat{\mathbf{H}}^p$ is expressed by the following formula:

$$\tilde{H}^{P1} = \begin{bmatrix} \hat{H}_{11}^p s_1^p & \cdots & \hat{H}_{1M}^p s_M^p & 0 & \cdots & 0 & 0 & \cdots & 0 \\ 0 & \cdots & 0 & \hat{H}_{21}^p s_1^p & \cdots & \hat{H}_{2M}^p s_M^p & \vdots & \cdots & \vdots \\ \vdots & \cdots & \vdots & \vdots & \cdots & \vdots & 0 & \cdots & 0 \\ 0 & \cdots & 0 & 0 & \cdots & 0 & \hat{H}_{N1}^p s_1^p & \cdots & \hat{H}_{NM}^p s_M^p \end{bmatrix}.$$

In combination with the sixth possible implementation manner of the first aspect, in a ninth possible implementation manner, the determining, by the receiver, the channel phase shift parameters from the M transmitting antennas to the N receiving antennas according to the signals arrived at the N receiving antennas which come from the second pilot signals sent on the first data symbol by the M transmitting antennas, includes: determining, by the receiver according to at least one group of pilot signals arrived at the $n^{th}$ receiving antenna in the N receiving antennas which come from the second pilot signals sent on the first data symbol by the M transmitting antennas, channel phase shift parameters from the M transmitting antennas to the $n^{th}$ receiving antenna in the N receiving antennas, wherein each group of pilot signals in the at least one group of pilot signals contains pilot signals received on J numbers of subcarriers by the N receiving antennas, and a value of J is not smaller than M.

In combination with the ninth possible implementation manner of the first aspect, in a tenth possible implementation manner, the determining, by the receiver according to at least one group of pilot signals arrived at the $n^{th}$ receiving antenna in the N receiving antennas which come from the second pilot signals sent on the first data symbol by the M transmitting antennas, channel phase shift parameters from the M transmitting antennas to the $n^{th}$ receiving antenna in the N receiving antennas, includes: determining, by the receiver, multiple groups of channel phase shift parameters from the M transmitting antennas to the $n^{th}$ receiving antenna in the N receiving antennas according to multiple groups of pilot signals arrived at the $n^{th}$ receiving antenna in the N receiving antennas which come from the second pilot signals sent on the first data symbol by the M transmitting antennas, and determining an average value of channel phase shift parameters in the multiple groups of channel phase shift parameters corresponding to a channel phase shift parameter from the $m^{th}$ transmitting antenna in the M transmitting antennas to the $n^{th}$ receiving antenna in the N receiving antennas as a channel phase shift parameter from the $m^{th}$ transmitting antenna in the M transmitting antennas to the $n^{th}$ receiving antenna in the N receiving antennas.

In combination with the ninth possible implementation manner of the first aspect, in an eleventh possible implementation manner, it is specifically implemented as follows: the determining, by the receiver according to the channel estimation parameters from the M transmitting antennas to the N receiving antennas and the channel phase shift parameters from the M transmitting antennas to the N receiving antennas, signal compensation for the data signals arrived at the N receiving antennas that are sent on the first data symbol by the M transmitting antennas, is expressed by the following formula:

$$\begin{bmatrix} \hat{x}_1^k \\ \vdots \\ \hat{x}_M^k \end{bmatrix} = [[H_\xi^k]^\dagger H_\xi^k]^{-1} [H_\xi^k]^\dagger \begin{bmatrix} y_1^k(l) \\ \vdots \\ y_N^k(l) \end{bmatrix}$$

wherein $\hat{x}_m^k$ represents a data signal obtained by a receiving terminal by demodulation that is transmitted on the $k^{th}$ subcarrier of the $l^{th}$ data symbol by the $m^{th}$ transmitting antenna, $y_n^k(l)$ represents a pilot signal arrived at the $n^{th}$ receiving antenna of the receiver which comes from a pilot signal sent on the $k^{th}$ subcarrier of the $l^{th}$ data symbol by the M transmitting antennas, $\forall n=\{1, \ldots, N\}$, $k \in K$, $[\mathbf{H}_\xi^k]^\dagger$ represents a conjugate matrix of $\mathbf{H}_\xi^k$, $$H_\xi^k = \begin{bmatrix} \hat{H}_{11}^k e^{j\xi_{11}} & \cdots & \hat{H}_{1M}^k e^{j\xi_{1M}} \\ \vdots & \vdots & \vdots \\ \hat{H}_{N1}^k e^{j\xi_{N1}} & \cdots & \hat{H}_{NM}^k e^{j\xi_{NM}} \end{bmatrix},$$

$\hat{\mathbf{H}}_{nm}^k$ in $\mathbf{H}_\xi^k$ represents a channel estimation parameter on the $k^{th}$ subcarrier between the $m^{th}$ transmitting antenna of the remote transmitter and the $n^{th}$ receiving antenna of the receiver, $\hat{\mathbf{H}}_{nm}^k = y_n^k(t)/s^k$, $\forall n=\{1, \ldots, N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $e^{j\xi_n}$ represents a channel phase shift parameter from the M transmitting antennas to the $n^{th}$ receiving antenna in the N receiving antennas and is expressed by the following formula:

$$e^{jg_n} = \left[ \begin{bmatrix} \hat{H}_{n1}^{J_1}s_1^{J_1} & \cdots & \hat{H}_{nM}^{J_1}s_M^{J_1} \\ \vdots & \cdots & \vdots \\ \hat{H}_{n1}^{J_{|J|}}s_1^{J_{|J|}} & \cdots & \hat{H}_{nM}^{J_{|J|}}s_M^{J_{|J|}} \end{bmatrix}^{\dagger} \begin{bmatrix} \hat{H}_{n1}^{J_1}s_1^{J_1} & \cdots & \hat{H}_{nM}^{J_1}s_M^{J_1} \\ \vdots & \cdots & \vdots \\ \hat{H}_{n1}^{J_{|J|}}s_1^{J_{|J|}} & \cdots & \hat{H}_{nM}^{J_{|J|}}s_M^{J_{|J|}} \end{bmatrix} \right]^{-1}$$

$$\begin{bmatrix} \hat{H}_{n1}^{J_1}s_1^{J_1} & \cdots & \hat{H}_{nM}^{J_1}s_M^{J_1} \\ \vdots & \cdots & \vdots \\ \hat{H}_{n1}^{J_{|J|}}s_1^{J_{|J|}} & \cdots & \hat{H}_{nM}^{J_{|J|}}s_M^{J_{|J|}} \end{bmatrix}^{\dagger} \begin{bmatrix} y_n^{J_1}(l) \\ \vdots \\ y_n^{J_{|J|}}(l) \end{bmatrix}$$

wherein $y_n^J(l)$ represents a pilot signal arrived at the $n^{th}$ receiving antenna in the N receiving antennas which comes from a pilot signal transmitted on the pilot subcarrier J of the $l^{th}$ data symbol by the M transmitting antennas, J represents any pilot subcarrier in a pilot subcarrier set $\{J_1, \ldots J_{|J|}\}$ of the $l^{th}$ data symbol, and $s_m^J$ represents a pilot signal transmitted on the pilot subcarrier J of the $l^{th}$ data symbol by the $m^{th}$ transmitting antenna in the M transmitting antennas.

In combination with the first aspect or any possible implementation manner from the first possible implementation manner of the first aspect to the eleventh possible implementation manner of the first aspect, in a twelfth possible implementation manner, it is specifically implemented as follows: any two adjacent measurement signals of one of the plurality of channel estimation preamble signals are isolated by at least one void subcarrier.

In a second aspect, a method for transmitting a signal is provided. The method includes: sending, by a transmitter via M transmitting antennas, a plurality of channel estimation preamble signals to N receiving antennas of a remote receiver, wherein the plurality of channel estimation preamble signals contain first pilot signals of the M transmitting antennas, M and N are integers larger than 1, the first pilot signals in the plurality of channel estimation preamble signals are used by the remote receiver for determining channel estimation parameters from the M transmitting antennas to the N receiving antennas, and each one of the plurality of channel estimation preamble signals is separately transmitted by one transmitting antenna in the M transmitting antennas; and sending, by the transmitter via the M transmitting antennas, data signals and second pilot signals on a data symbol, wherein the second pilot signals are used by the remote receiver for determining channel phase shift parameters from the M transmitting antennas to the N receiving antennas, and further determining signal compensation of the data signals according to the channel estimation parameters and the channel phase shift parameters.

In combination with the second aspect, in a first possible implementation manner, it is specifically implemented as follows: any two adjacent measurement signals of one of the plurality of channel estimation preamble signals are isolated by at least one void subcarrier.

In combination with the second aspect or the first possible implementation manner of the second aspect, in a second possible implementation manner, it is specifically implemented as follows: there is one or more subcarriers on the data symbol for sending the second pilot signals.

In combination with the second aspect or the first possible implementation manner of the second aspect or the second possible implementation manner of the second aspect, in a third possible implementation manner, it is specifically implemented as follows: the M transmitting antennas of the transmitter are coherent or incoherent.

In a third aspect, a receiver is provided. The receiver includes N receiving antennas and a determining unit, wherein the N receiving antennas are configured to receive a plurality of channel estimation preamble signals sent by M transmitting antennas of a remote transmitter, wherein the plurality of channel estimation preamble signals contain first pilot signals of the M transmitting antennas, and M and N are integers larger than 1; the determining unit is configured to determine channel estimation parameters from the M transmitting antennas to the N receiving antennas according to the first pilot signals of the M transmitting antennas contained in the plurality of channel estimation preamble signals; the N receiving antennas are further configured to receive data signals and second pilot signals sent on a first data symbol by the M transmitting antennas; the determining unit is further configured to determine channel phase shift parameters from the M transmitting antennas to the N receiving antennas according to signals arrived at the N receiving antennas which come from the second pilot signals sent on the first data symbol by the M transmitting antennas; and the determining unit is further configured to determine according to the channel estimation parameters from the M transmitting antennas to the N receiving antennas and the channel phase shift parameters from the M transmitting antennas to the N receiving antennas, signal compensation for the data signals arrived at the N receiving antennas that are sent on the first data symbol by the M transmitting antennas.

In combination with the third aspect, in a first possible implementation manner, it is specifically implemented as follows: a subcarrier set for sending a first pilot signal of the $m^{th}$ transmitting antenna in the M transmitting antennas is equal to a set of subcarriers of the $m^{th}$ transmitting antenna, $\forall m=\{1, \ldots, M\}$.

In combination with the third aspect or the first possible implementation manner of the third aspect, in a second possible implementation manner, it is specifically implemented as follows: the N receiving antennas are coherent, and the M transmitting antennas are coherent.

In combination with the second possible implementation manner of the third aspect, in a third possible implementation manner, it is specifically implemented as follows: in a process of determining the channel phase shift parameters from the M transmitting antennas to the N receiving antennas according to signals arrived at the N receiving antennas which come from the second pilot signals sent on the first data symbol by the M transmitting antennas, the determining unit is specifically configured to:

determine first channel phase shift parameters according to a signal arrived at the N receiving antennas which comes from a second pilot signal sent on the first data symbol by the $m^{th}$ transmitting antenna in the M transmitting antennas, wherein the first channel phase shift parameters are channel phase shift parameters from the $m^{th}$ transmitting antenna in the M transmitting antennas to the N receiving antennas, $\forall m=\{1, \ldots, M\}$.

In combination with the third possible implementation manner of the third aspect, in a fourth possible implementation manner, it is specifically implemented as follows: in a process of determining, according to the signal arrived at the N receiving antennas which comes from the second pilot signal sent on the first data symbol by the $m^{th}$ transmitting antenna in the M transmitting antennas, channel phase shift parameters from the $m^{th}$ transmitting antenna in the M transmitting antennas to the N receiving antennas, the determining unit is specifically configured to: if there is more than one subcarrier on the first data symbol for sending the second pilot signal, determine, according to signals arrived at the N receiving antennas which come from the second pilot signals sent on a plurality of subcarriers of the first data symbol by the $m^{th}$ transmitting antenna in the M transmitting antennas, multiple groups of channel phase shift parameters from the $m^{th}$ transmitting antenna in the M transmitting antennas to the N receiving antennas, and determine average values of the multiple groups of channel phase shift parameters as the channel phase shift parameters from the $m^{th}$ transmitting antenna in the M transmitting antennas to the N receiving antennas.

In combination with the third possible implementation manner of the third aspect or the fourth possible implementation manner of the third aspect, in a fifth possible implementation manner, it is specifically implemented as follows: determining, by the determining unit, the signal compensation for the data signals arrived at the N receiving antennas that are sent on the first data symbol by the M transmitting antennas, is expressed by the following formula:

$$\begin{bmatrix} \hat{x}_1^k \\ \vdots \\ \hat{x}_M^k \end{bmatrix} = \begin{bmatrix} e^{-j\hat{\theta}_{k_1,l}} & \cdots & 0 \\ \vdots & \vdots & \vdots \\ 0 & \cdots & e^{-j\hat{\theta}_{k_M,l}} \end{bmatrix} \left[ [\hat{H}^k]^\dagger \hat{H}^k \right]^{-1} [\hat{H}^k]^\dagger \begin{bmatrix} y_1^k(l) \\ \vdots \\ y_N^k(l) \end{bmatrix}$$

wherein $\hat{x}_m^k$ represents a data signal transmitted on the $k^{th}$ subcarrier of the $l^{th}$ data symbol by the $m^{th}$ transmitting antenna in the M transmitting antennas, $y_n^k(l)$ represents a signal arrived at the $n^{th}$ receiving antenna of the receiver which comes from a data signal transmitted on the $k^{th}$ subcarrier of the $l^{th}$ data symbol by the M transmitting antennas, $\forall m=\{1, \ldots, M\}$, $\forall n=\{1, \ldots, N\}$, $\hat{H}^k$ represents a channel estimation parameter matrix on the $k^{th}$ subcarrier between the M transmitting antennas and the N receiving antennas, $[\hat{H}^k]^\dagger$ represents a conjugate matrix of $\hat{H}^k$, $\hat{H}_{nm}^k$ in $\hat{H}^k$ represents a channel estimation parameter on the $k^{th}$ subcarrier between the $m^{th}$ transmitting antenna of the remote transmitter and the $n^{th}$ receiving antenna of the receiver, $\hat{H}_{nm}^k = y_n^k(t)/s^k$, $\forall n=\{1, \ldots, N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a data signal transmitted on the $k^{th}$ subcarrier of the $l^{th}$ data symbol by the M transmitting antennas, $$\begin{bmatrix} e^{j\hat{\theta}_{k_1,l}} \\ \vdots \\ e^{j\hat{\theta}_{k_M,l}} \end{bmatrix}$$

represents channel phase shift parameters for signals arrived at the N receiving antennas which are sent on the $k^{th}$ subcarrier of the $l^{th}$ data symbol by the M transmitting antennas, and is expressed by the following formula:

$$\begin{bmatrix} e^{j\hat{\theta}_{k_1,l}} \\ \vdots \\ e^{j\hat{\theta}_{k_M,l}} \end{bmatrix} = \begin{bmatrix} s_1^k & \cdots & 0 \\ \vdots & \vdots & \vdots \\ 0 & \cdots & s_M^k \end{bmatrix} \left[ [\hat{H}^k]^\dagger \hat{H}^k \right]^{-1} [\hat{H}^k]^\dagger \begin{bmatrix} y_1^k(l) \\ \vdots \\ y_N^k(l) \end{bmatrix}$$

wherein $s_m^k$ represents a pilot signal transmitted on the $k^{th}$ subcarrier by the $m^{th}$ transmitting antenna of the remote transmitter, $y_n^k(l)$ represents a pilot signal arrived at the $n^{th}$ receiving antenna of the receiver which comes from a pilot signal sent on the $k^{th}$ subcarrier of the data $l^{th}$ symbol by the M transmitting antennas, and $e$ represents a channel phase shift parameter for the signal arrived at the N receiving antennas that is sent on the $k^{th}$ subcarrier of the $l^{th}$ data symbol by the $m^{th}$ transmitting antenna of the remote transmitter.

In combination with the third aspect or the first possible implementation manner of the third aspect, in a sixth possible implementation manner, it is specifically implemented as follows: the N receiving antennas are incoherent, and/or the M transmitting antennas are incoherent.

In combination with the sixth possible implementation manner of the third aspect, in a seventh possible implementation manner, it is specifically implemented as follows: in a process of determining the channel phase shift parameters from the M transmitting antennas to the N receiving antennas according to signals arrived at the N receiving antennas which come from the second pilot signals sent on the first data symbol by the M transmitting antennas, the determining unit is specifically configured to determine the channel phase shift parameters from the M transmitting antennas to the N receiving antennas according to all of pilot signals arrived at the N receiving antennas which come from the second pilot signals sent on the first data symbol by the M transmitting antennas, wherein a quantity of pilot subcarriers where all of the pilot signals are located is not smaller than M.

In combination with the seventh possible implementation manner of the third aspect, in an eighth possible implementation manner, it is specifically implemented as follows: determining, by the determining unit, signal compensation for the data signals arrived at the N receiving antennas that are sent on the first data symbol by the M transmitting antennas, is expressed by the following formula:

$$\begin{bmatrix} \hat{x}_1^k \\ \vdots \\ \hat{x}_M^k \end{bmatrix} = \left[ [H_\xi^k]^\dagger H_\xi^k \right]^{-1} [H_\xi^k]^\dagger \begin{bmatrix} y_1^k(l) \\ \vdots \\ y_N^k(l) \end{bmatrix}$$

wherein $\hat{x}_m^k$ represents a data signal transmitted on the $k^{th}$ subcarrier of the $l^{th}$ data symbol by the $m^{th}$ transmitting antenna in the M transmitting antennas, $y_n^k(l)$ represents a signal arrived at the $n^{th}$ receiving antenna of the receiver which comes from a data signal transmitted on the $k^{th}$ subcarrier of the $l^{th}$ data symbol by the M transmitting antennas, $\forall m=\{1, \ldots, M\}$, $\forall n=\{1, \ldots, N\}$, $[\hat{H}_\xi^k]^\dagger$ represents a conjugate matrix of $H_\xi^k$, $$H_\xi^k = \begin{bmatrix} \hat{H}_{11}^k e^{j\xi_{11}} & \cdots & \hat{H}_{1M}^k e^{j\xi_{1M}} \\ \vdots & \vdots & \vdots \\ \hat{H}_{N1}^k e^{j\xi_{N1}} & \cdots & \hat{H}_{NM}^k e^{j\xi_{NM}} \end{bmatrix},$$

$\hat{H}_{nm}^k$ in $H_\xi^k$ represents a channel estimation parameter on the $k^{th}$ subcarrier between the $m^{th}$ transmitting antenna of the remote transmitter and the $n^{th}$ receiving antenna of the receiver, $\hat{H}_{nm}{}^k=y_n{}^k(t)/s^k$, $\forall n=\{1, \ldots ,N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n{}^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $$\begin{bmatrix} e^{j\xi_{11}} & \ldots & e^{j\xi_{1M}} \\ \vdots & \vdots & \vdots \\ e^{j\xi_{N1}} & \ldots & e^{j\xi_{NM}} \end{bmatrix}$$

represents channel phase shift parameters for signals arrived at the N receiving antennas that are sent on the $1^{th}$ data symbol by the M transmitting antennas, and is expressed by the following formula:

$$\begin{bmatrix} e^{j\xi_{11}} & \ldots & e^{j\xi_{1M}} \\ \vdots & \vdots & \vdots \\ e^{j\xi_{N1}} & \ldots & e^{j\xi_{NM}} \end{bmatrix} = \begin{bmatrix} \tilde{H}^{P_1} \\ \vdots \\ \tilde{H}^{P_{|P|}} \end{bmatrix}^\dagger \begin{bmatrix} \tilde{H}^{P_1} \\ \vdots \\ \tilde{H}^{P_{|P|}} \end{bmatrix}^{-1} \begin{bmatrix} \tilde{H}^{P_1} \\ \vdots \\ \tilde{H}^{P_{|P|}} \end{bmatrix}^\dagger \begin{bmatrix} y_1^{P_1}(l) \\ \vdots \\ y_N^{P_1}(l) \\ y_1^{P_2}(l) \\ \vdots \\ y_N^{P_{|P|}}(l) \end{bmatrix}$$

wherein $y_n{}^p(l)$ represents a pilot signal arrived at the N receiving antennas which comes from a pilot signal transmitted on a pilot subcarrier p of the $l^{th}$ data symbol by the M transmitting antennas, p represents any pilot subcarrier in a pilot subcarrier set $\{p_1, \ldots p_{|P|}\}$ of the $l^{th}$ data symbol, and $\tilde{H}^p$ is expressed by the following formula:

$$\tilde{H}^P = \begin{bmatrix} \hat{H}_{11}^P s_1^P & \ldots & \hat{H}_{1M}^P s_M^P & 0 & \ldots & 0 & 0 & \ldots & 0 \\ 0 & \ldots & 0 & \hat{H}_{21}^P s_1^P & \ldots & \hat{H}_{2M}^P s_M^P & \vdots & \ldots & \vdots \\ \vdots & \ldots & \vdots & \vdots & \vdots & \vdots & 0 & \ldots & 0 \\ 0 & \ldots & 0 & 0 & \ldots & 0 & \hat{H}_{N1}^P s_1^P & \ldots & \hat{H}_{NM}^P s_M^P \end{bmatrix}.$$

In combination with the sixth possible implementation manner of the third aspect, in a ninth possible implementation manner, it is specifically implemented as follows: in a process of determining the channel phase shift parameters from the M transmitting antennas to the N receiving antennas according to the signals arrived at the N receiving antennas which come from the second pilot signals sent on the first data symbol by the M transmitting antennas, the determining unit is specifically configured to determine, according to at least one group of pilot signals arrived at the $n^{th}$ receiving antenna in the N receiving antennas which come from the second pilot signals sent on the first data symbol by the M transmitting antennas, channel phase shift parameters from the M transmitting antennas to the $n^{th}$ receiving antenna in the N receiving antennas, wherein each group of pilot signals in the at least one group of pilot signals contains pilot signals received on J numbers of subcarriers by the N receiving antennas, and a value of J is not smaller than M.

In combination with the ninth possible implementation manner of the third aspect, in a tenth possible implementation manner, it is specifically implemented as follows: in a process of determining, according to at least one group of pilot signals arrived at the $n^{th}$ receiving antenna in the N receiving antennas which come from the second pilot signals sent on the first data symbol by the M transmitting antennas, channel phase shift parameters from the M transmitting antennas to the $n^{th}$ receiving antenna in the N receiving antennas, the determining unit is specifically configured to determine multiple groups of channel phase shift parameters from the M transmitting antennas to the $n^{th}$ receiving antenna in the N receiving antennas according to multiple groups of pilot signals arrived at the $n^{th}$ receiving antenna in the N receiving antennas which come from the second pilot signals sent on the first data symbol by the M transmitting antennas, and determine an average value of corresponding channel phase shift parameters in the multiple groups of channel phase shift parameters of a channel phase shift parameter from the $m^{th}$ transmitting antenna in the M transmitting antennas to the $n^{th}$ receiving antenna in the N receiving antennas as a channel phase shift parameter from the $m^{th}$ transmitting antenna in the M transmitting antennas to the $n^{th}$ receiving antenna in the N receiving antennas.

In combination with the ninth possible implementation manner of the third aspect, in an eleventh possible implementation manner, it is specifically implemented as follows: determining, by the determining unit, signal compensation for the data signals arrived at the N receiving antennas that are sent on the first data symbol by the M transmitting antennas, is expressed by the following formula:

$$\begin{bmatrix} \hat{x}_1^k \\ \vdots \\ \hat{x}_M^k \end{bmatrix} = [[H_\xi^k]^\dagger \hat{H}_\xi^k]^{-1} [H_\xi^k]^\dagger \begin{bmatrix} y_1^k(l) \\ \vdots \\ y_N^k(l) \end{bmatrix}$$

wherein, $\hat{x}_m{}^k$ represents a data signal obtained by a receiving terminal by demodulation that is transmitted on the $k^{th}$ subcarrier of the $l^{th}$ data symbol by the $m^{th}$ transmitting antenna, $y_n{}^k(l)$ represents a pilot signal arrived at the nth receiving antenna of the receiver which comes from a pilot signal sent on the kth subcarrier of the lth data symbol by the M transmitting antennas, $\forall n=\{1, \ldots ,N\}$, $k \in K$, $[H_\xi^k]^\dagger$ represents a conjugate matrix of $H_\xi^k$, $$H_\xi^k = \begin{bmatrix} \hat{H}_{11}^k e^{j\xi_{11}} & \ldots & \hat{H}_{1M}^k e^{j\xi_{1M}} \\ \vdots & \vdots & \vdots \\ \hat{H}_{N1}^k e^{j\xi_{N1}} & \ldots & \hat{H}_{NM}^k e^{j\xi_{NM}} \end{bmatrix}$$

$\hat{H}_{nm}{}^k$ in $H_\xi^k$ represents a channel estimation parameter on the $k^{th}$ subcarrier between the $m^{th}$ transmitting antenna of the remote transmitter and the $n^{th}$ receiving antenna of the receiver. $\hat{H}_{nm}{}^k=y_n{}^k(t)/s^k$, $\forall n=\{1, \ldots ,N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n{}^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $e^{j\xi_n}$ represents a channel phase shift parameter matrix from the M transmitting antennas to the $n^{th}$ receiving antenna in the N receiving antennas and is expressed by the following formula:

$$e^{j\xi_n} = \left[ \begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|J|}} s_1^{J_{|J|}} & \cdots & \hat{H}_{nM}^{J_{|J|}} s_M^{J_{|J|}} \end{bmatrix}^{\dagger} \begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|J|}} s_1^{J_{|J|}} & \cdots & \hat{H}_{nM}^{J_{|J|}} s_M^{J_{|J|}} \end{bmatrix} \right]^{-1}$$

$$\begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|J|}} s_1^{J_{|J|}} & \cdots & \hat{H}_{nM}^{J_{|J|}} s_M^{J_{|J|}} \end{bmatrix}^{\dagger} \begin{bmatrix} y_n^{J_1}(l) \\ \vdots \\ y_n^{J_{|J|}}(l) \end{bmatrix}$$

wherein $y_n^J(l)$ represents a pilot signal arrived at the $n^{th}$ receiving antenna in the N receiving antennas which comes from a pilot signal transmitted on the pilot subcarrier J of the $l^{th}$ data symbol by the M transmitting antennas, J represents any pilot subcarrier in a pilot subcarrier set $\{J_1, \ldots J_{|J|}\}$ of the $l^{th}$ data symbol, and $s_m^J$ represents a pilot signal transmitted on the pilot subcarrier J of the $l^{th}$ data symbol by the $m^{th}$ transmitting antenna in the M transmitting antennas.

In combination with the third aspect or any possible implementation manner from the first possible implementation manner of the third aspect to the eleventh possible implementation manner of the third aspect, in a twelfth possible implementation manner, it is specifically implemented as follows: any two adjacent measurement signals of one of the plurality of channel estimation preamble signals are isolated by at least one void subcarrier.

In a fourth aspect, a transmitter is provided. The transmitter includes: a signal generating unit and M transmitting antennas, wherein the signal generating unit is configured to generate a plurality of channel estimation preamble signals, wherein the plurality of channel estimation preamble signals contain first pilot signals of the M transmitting antennas, M and N are integers larger than 1, the first pilot signals in the plurality of channel estimation preamble signals are used by a remote receiver for determining channel estimation parameters from the M transmitting antennas to the N receiving antennas; the M transmitting antennas are configured to send the plurality of channel estimation preamble signals to N receiving antennas of the remote receiver, wherein each one of the plurality of channel estimation preamble signals is separately transmitted by one transmitting antenna in the M transmitting antennas; the signal generating unit is further configured to generate data signals and second pilot signals; the M transmitting antennas are further configured to send the data signals and the second pilot signals on a data symbol, wherein the second pilot signals are used by the remote receiver for determining channel phase shift parameters from the M transmitting antennas to the N receiving antennas, and further determining signal compensation of the data signals according to the channel estimation parameters and the channel phase shift parameters.

In combination with the fourth aspect, in a first possible implementation manner, it is specifically implemented as follows: any two adjacent measurement signals of one of the plurality of channel estimation preamble signals are isolated by at least one void subcarrier.

In combination with the fourth aspect or the first possible implementation manner of the fourth aspect, in a second possible implementation manner, it is specifically implemented as follows: there is one or more subcarriers on the data symbol for sending the second pilot signals.

In combination with the fourth aspect or the first possible implementation manner of the fourth aspect or the second possible implementation manner of the second aspect, in a third possible implementation manner, it is specifically implemented as follows: the M transmitting antennas of the transmitter are coherent or incoherent.

In the fifth aspect, a multiple-input multiple-output orthogonal frequency division multiplexing communication system is provided. The system includes a receiver and a transmitter, wherein the receiver is the receiver in the third aspect or in any possible implementation manner from the first possible implementation manner of the third aspect to the twelfth possible implementation manner of the third aspect in the present disclosure, and the transmitter is the transmitter in the fourth aspect or in the first possible implementation manner of the fourth aspect or the second possible implementation manner of the fourth aspect in the present disclosure.

By adopting the multiple-input multiple-output orthogonal frequency division multiplexing communication system and the method for signal compensation provided by the embodiments of the present disclosure, the receiver determines the signal compensation of the data signals according to the channel estimation parameters from the transmitting antennas of the remote transmitter to the receiving antennas of the receiver and the channel phase shift parameters of the transmitting antennas of the remote transmitter on the first data symbol, thereby improving demodulation accuracy of transmitted data to a certain extent.

BRIEF DESCRIPTION OF DRAWINGS

To illustrate the technical solutions in the embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

FIG. 11 is a schematic diagram of another transmission manner of a channel preamble signal in an embodiment of the present disclosure.

FIG. 12 is a flowchart of another method for sending a signal in an embodiment of the present disclosure.

DESCRIPTION OF EMBODIMENTS

Figure 1:
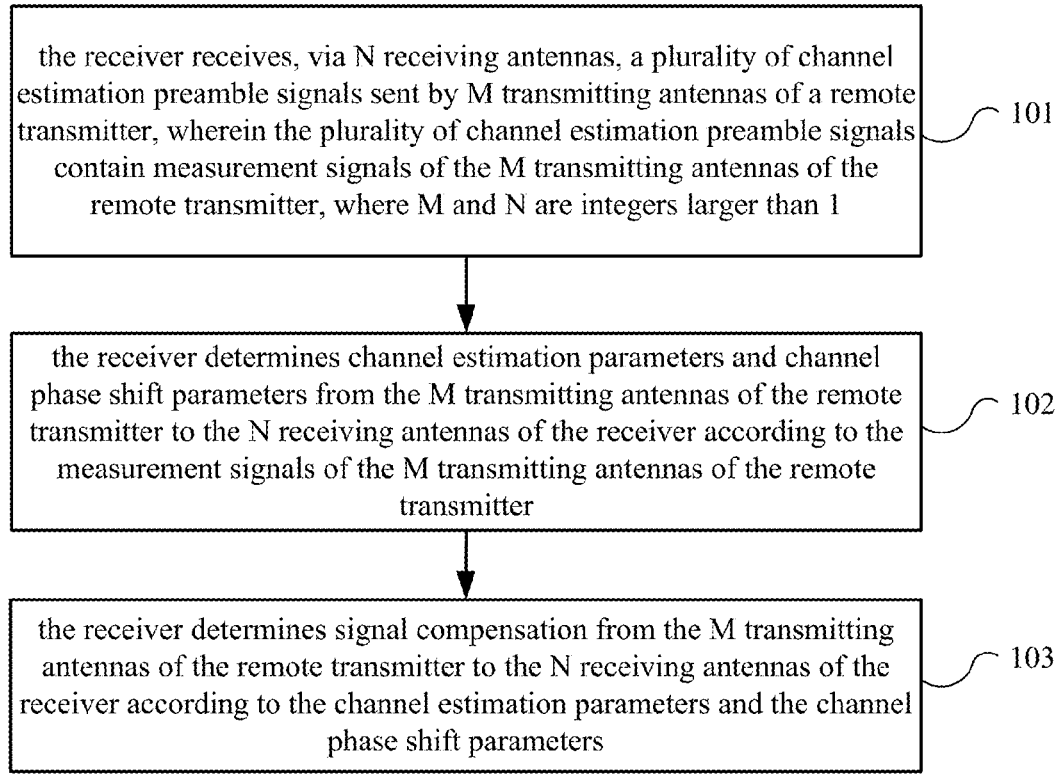
FIG. 1 is a flowchart of a method for signal compensation in an embodiment of the present disclosure.

The technical solution in the embodiments of the present disclosure will be described clearly and fully hereinafter in conjunction with the drawings in the embodiments of the present disclosure. Apparently, the embodiments described below are merely a part, but not all, of the embodiments of the present disclosure. All of the other embodiments, which are obtained by those of ordinary skill in the art based on the embodiments of the present disclosure without any creative effort, fall into the protection scope of the present disclosure.

The technical solutions of the present disclosure may be applied to various communication systems, such as, for example, a global system of mobile communication (GSM), a code division multiple access (CDMA) system, wideband code division multiple access (WCDMA), general packet radio service wireless (GPRS), long term evolution (LTE), etc.

A user equipment (UE), which may also be referred to as a mobile terminal, a mobile user equipment and the like, may communicate with one or multiple core networks through a radio access network (RAN). The user equipment may be a mobile terminal, such as, for example, a mobile telephone (or referred to as a "cellular" telephone) and a computer having a mobile terminal, such as, for example, may be a portable, pocket, hand-held, computer inbuilt or vehicle-mounted mobile apparatus, and they exchange language and/or data with a radio access network.

A base station may be a base transceiver station (BTS) in GSM or CDMA, or may be a base station (NodeB) in WCDMA or an evolutional base station (eNB or e-NodeB, evolutional Node B) in LTE, which is not limited by the present disclosure. However, for the convenience of description, eNB is taken as an example for illustration in the following embodiments.

In order to facilitate understanding of embodiments of the present disclosure, several elements which will be introduced in the descriptions of the embodiments of the present disclosure are firstly illustrated herein.

Receiving antennas of a receiver being coherent refers to that all receiving antennas of the receiver adopt a same local frequency.

Transmitting antennas of a transmitter being coherent refers to that all transmitting antennas of the transmitter adopt a same local frequency.

Receiving antennas of a receiver being incoherent refers to that local frequencies adopted by all receiving antennas of the receiver are not completely the same, and there exists at least two receiving antennas adoting different local frequencies.

Transmitting antennas of a transmitter being incoherent refers to that local frequencies adopted by all transmitting antennas of the transmitter are not completely the same, and there exists at least two transmitting antennas adoting different local frequencies.

Receiving and sending being incoherent may include the following three conditions: only the receiving antennas are incoherent, only the transmitting antennas are incoherent, and both the receiving antennas and the transmitting antennas are incoherent.

FIG. 1 is a flowchart of a method for signal compensation in an embodiment of the present disclosure. The method shown in FIG. 1 is executed by a receiver. The receiver mentioned herein refers to a receiving end device of an MIMO-OFDM system, and it may be a base station, a mobility management entity (MME), a gateway or other network element, which is not limited herein in the embodiment of the present disclosure.

101, the receiver receives, via N receiving antennas, a plurality of channel estimation preamble signals sent by M transmitting antennas of a remote transmitter, wherein the plurality of channel estimation preamble signals contain measurement signals of the M transmitting antennas of the remote transmitter, where M and N are integers larger than 1.

102, the receiver determines channel estimation parameters and channel phase shift parameters from the M transmitting antennas of the remote transmitter to the N receiving antennas of the receiver according to the measurement signals of the M transmitting antennas of the remote transmitter.

103, the receiver determines signal compensation from the M transmitting antennas of the remote transmitter to the N receiving antennas of the receiver according to the channel estimation parameters and the channel phase shift parameters.

In the embodiment of the present disclosure, the channel estimation parameters and the channel phase shift parameters are determined according to the measurement signals of the remote transmitter, and the signal compensation is further determined, thereby improving accuracy of an estimated value of transmitted data.

Optionally, a subcarrier set for sending a measurement signal of the $m^{th}$ transmitting antenna in the M transmitting antennas is equal to a set of subcarriers of the $m^{th}$ transmitting antenna, where $\forall m=\{1, \ldots ,M\}$. By sending the measurement signal on an entire range of carriers of one transmitting antenna, a receiver at a receiving end is enabled to obtain the channel estimation parameters and the channel phase shift parameters of all subcarriers of the transmitting antenna.

In the embodiment of the present disclosure, a measurement signal may be a preset measurement signal. The transmitter and the receiver may appoint a signal parameter of the measurement signal in advance, such as, for example, a transmitting power and the like; or, the transmitter and the receiver may determine a signal parameter of the measurement signal according to protocol regulation.

Preferably, the measurement signal may include a pilot signal. Of course, a possibility of using other signal as the measurement signal is not excluded.

Optionally, the determining, by the receiver, the channel estimation parameters and the channel phase shift parameters from the M transmitting antennas of the remote transmitter to the N receiving antennas of the receiver according to the measurement signals of the M transmitting antennas of the remote transmitter, may be specifically implemented as follows: the receiver determines the channel estimation parameters from the M transmitting antennas of the remote transmitter to the N receiving antennas of the receiver according to measurement signals transmitted by the M transmitting antennas of the remote transmitter and measurement signals received by the N receiving antennas of the receiver; and the receiver determines the channel phase shift parameters from the M transmitting antennas of the remote transmitter to the N receiving antennas of the receiver according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas of the receiver.

Optionally, as one embodiment, the determining, by the receiver, the channel estimation parameters and the channel phase shift parameters from the M transmitting antennas of the remote transmitter to the N receiving antennas of the receiver according to the measurement signals of the M transmitting antennas of the remote transmitter may include: determining, by the receiver, at least one channel estimation parameter and at least one channel phase shift parameter for the $k^{th}$ subcarrier of the $m^{th}$ transmitting antenna according to at least one measurement signal on the $k^{th}$ subcarrier of the $m^{th}$ transmitting antenna; and determining, by the receiver, an average value of the at least one channel estimation parameter for the $k^{th}$ subcarrier of the $m^{th}$ transmitting antenna and an average value of the at least one channel phase shift parameter for the $k^{th}$ subcarrier of the $m^{th}$ transmitting antenna as a channel estimation parameter and a channel phase shift parameter for the $k^{th}$ subcarrier of the $m^{th}$ transmitting antenna, wherein the $m^{th}$ transmitting antenna is one of the M transmitting antennas, $\forall m = \{1, \ldots, M\}$.

In embodiment one of the present disclosure, it is assumed that the transmitter of the MIMO-OFDM system sends the $l^{th}$ channel estimation preamble signal via the $m^{th}$ transmitting antenna, wherein a pilot signal in the channel estimation preamble signal is used as the measurement signal, and a subcarrier set for sending the pilot signal is K. On the $k^{th}$ subcarrier, where $k \in K$, signals of the N receiving antennas may be expressed by formula (1).

$$\begin{bmatrix} y_1^k(l) \\ \vdots \\ y_N^k(l) \end{bmatrix} = \underbrace{\begin{bmatrix} H_{11}^k & \cdots & H_{1M}^k \\ \vdots & \cdots & \vdots \\ H_{N1}^k & \cdots & H_{NM}^k \end{bmatrix}}_{H^k} \begin{bmatrix} 0 \\ \vdots \\ 0 \\ s^k \\ 0 \\ \vdots \\ 0 \end{bmatrix} e^{j\theta_l} + ICI_l + z_l = \begin{bmatrix} H_{1m}^k e^{j\theta_l} s^k \\ \vdots \\ H_{Nm}^k e^{j\theta_l} s^k \end{bmatrix} = ICI_l + z_l \quad (1)$$

where $$\begin{bmatrix} y_1^k(l) \\ \vdots \\ y_N^k(l) \end{bmatrix}$$

represents signals received on the $k^{th}$ subcarrier by the N receiving antennas of the receiver;

$$\underbrace{\begin{bmatrix} H_{11}^k & \cdots & H_{1M}^k \\ \vdots & \cdots & \vdots \\ H_{N1}^k & \cdots & H_{NM}^k \end{bmatrix}}_{H^k}$$

represents channel parameters from the M transmitting antennas of the transmitter to the N receiving antennas of the receiver, $s^k$ represents a pilot signal of the $k^{th}$ subcarrier, $e^{j\theta_l}$ represents a phase shift parameter of the $l^{th}$ subcarrier, $ICI_l$ represents inter-carrier interference of the $l^{th}$ channel estimation preamble signal, and $z_l$ represents a noise of the $l^{th}$ channel estimation preamble signal.

Formula (2) may be obtained according to LS estimation.

$$\hat{H}_{nm}^k = \frac{y_n^k(l)}{s^k} \approx H_{nm}^k e^{j\theta_l}, \forall n = \{1, \ldots, N\}, k \in K \quad (2)$$

In order to represent all of channel estimations of the $k^{th}$ subcarrier, namely $\{\hat{H}_{nm}^k, \forall n,m\}$, it is assumed that the $m^{th}$ antenna sends in $k_m$ numbers of channel estimation preamble signals and the $k^{th}$ subcarrier is a subcarrier for sending a pilot signal, then a channel estimation of the $k^{th}$ subcarrier may be expressed by formula (3), $$\hat{H}_{nm}^k \approx H_{nm}^k e^{j\theta_{k_m}}, \forall n = \{1, \cdots, N\}, \forall m = \{1, \cdots, M\} \quad (3)$$

At a data demodulation stage, it is necessary to track a phase shift caused by a phase noise and a frequency offset. Optionally, a pilot signal may be inserted into an OFDM data symbol, and the phase shift is estimated via the pilot signal. Receiving signals on the $k^{th}$ pilot subcarrier of the $l^{th}$ OFDM data symbol may be expressed by formula (4).

$$\begin{bmatrix} y_1^k(l) \\ \vdots \\ y_N^k(l) \end{bmatrix} = H^k \begin{bmatrix} s_1^k \\ \vdots \\ s_m^k \end{bmatrix} e^{j\theta_l} + ICI_l + z_l \quad (4)$$

Formula (5) may be obtained by substituting formula (3) into formula (4).

$$\begin{bmatrix} y_1^k(l) \\ \vdots \\ y_N^k(l) \end{bmatrix} \approx \hat{H}^k \begin{bmatrix} s_1^k & \cdots & 0 \\ \vdots & \vdots & \vdots \\ 0 & \cdots & s_M^k \end{bmatrix} \begin{bmatrix} e^{j\theta_{k_1,l}} \\ \vdots \\ e^{j\theta_{k_M,l}} \end{bmatrix} + ICI_l + z_l \quad (5)$$

Formula (6) may be obtained by the LS estimation.

$$\begin{bmatrix} e^{j\theta_{k_1,l}} \\ \vdots \\ e^{j\theta_{k_M,l}} \end{bmatrix} \approx \begin{bmatrix} s_1^k & \cdots & 0 \\ \vdots & \vdots & \vdots \\ 0 & \cdots & s_M^k \end{bmatrix} \left[ [\hat{H}^k]^\dagger \hat{H}^k \right]^{-1} [\hat{H}^k]^\dagger \begin{bmatrix} y_1^k(l) \\ \vdots \\ y_N^k(l) \end{bmatrix} \quad (6)$$

where $\theta_{k_m,l} = \theta_l - \theta_{k_m}$, and $[\hat{H}^k]^\dagger$ represents a conjugate matrix of $\hat{H}^k$.

If there exists other pilot subcarrier g satisfying $k_m=g_m$, $\forall m$, that is, each transmitting antenna simultaneously sends pilot signals on the subcarriers k and g, and a more accurate estimation may be obtained by averaging over estimated values obtained from the subcarriers k and g. If there are a plurality of such subcarriers, a more accurate estimated value may be obtained by averaging over the plurality of such subcarriers. Specifically, it is assumed that in a set P, if k, g∈P, then $k_m=g_m$, $\forall m$, and an average value may be figured out as shown in formula (7).

$$e^{j\hat{\theta}_{k_m,l}} = \frac{\sum_{n \in P} e^{j\hat{\theta}_{nm,l}}}{|P|}, \forall m = \{1, ..., M\} \quad (7)$$

where |P| represents a cardinal number of the set P.

After tracking the phase shift caused by the phase noise and the frequency offset, it is necessary to compensate data. Specifically, received signals on the $d^{th}$ data subcarrier of the $l^{th}$ OFDM data symbol may be expressed by formula (8).

$$\begin{bmatrix} y_1^d(l) \\ \vdots \\ y_N^d(l) \end{bmatrix} = H^d \begin{bmatrix} x_1^d \\ \vdots \\ x_M^d \end{bmatrix} e^{j\theta_l} + ICI_l + z_l \quad (8)$$

where $x_m^k$ represents a QAM signal of the $k^{th}$ subcarrier transmitted by the $m^{th}$ transmitting antenna. Formula (9) may be obtained by substituting formula (3) into formula (8).

$$\begin{bmatrix} y_1^d(l) \\ \vdots \\ y_N^d(l) \end{bmatrix} \approx \hat{H}^d \begin{bmatrix} x_1^d & \cdots & 0 \\ \vdots & \vdots & \vdots \\ 0 & \cdots & x_M^d \end{bmatrix} \begin{bmatrix} e^{j\theta_{d_1,l}} \\ \vdots \\ e^{j\theta_{d_M,l}} \end{bmatrix} + ICI_l + z_l \quad (9)$$

Formula (10) may be obtained by substituting formula (7) into formula (9) and by utilizing the LS estimation method.

$$\begin{bmatrix} \hat{x}_1^d \\ \vdots \\ \hat{x}_M^d \end{bmatrix} \approx \begin{bmatrix} e^{-j\hat{\theta}_{d_1,l}} & \cdots & 0 \\ \vdots & \vdots & \vdots \\ 0 & \cdots & e^{-j\hat{\theta}_{d_M,l}} \end{bmatrix} [[\hat{H}^d]^\dagger \hat{H}^d]^{-1} [\hat{H}^d]^\dagger \begin{bmatrix} y_1^d(l) \\ \vdots \\ y_N^d(l) \end{bmatrix} \quad (10)$$

Formula (10) is a channel compensation formula determined according to the channel estimation parameters and the channel phase shift parameters. It should be noted that, in formula (8) to formula (10), a serial number of a subcarrier is represented by d instead of k, so as to distinguish a serial number of a data subcarrier from a serial number of a pilot subcarrier. A pilot signal $s\hat{0}k$ in a pilot subcarrier is known at a receiving end, while a data signal $x\hat{0}d$ in a data subcarrier d is unknown at the receiving end and is the data needing to be demodulated.

It should be noted that, although the symbol "≈" is used in formula (10), in a practical demodulation process, a calculation is performed by taking the symbol "≈" as the symbol "=", so as to obtain a demodulated signal.

In addition, in order to reduce inter-carrier interference (ICI), when the transmitting antennas of the transmitter send the channel estimation preamble signals, a void subcarrier may be inserted between pilot signals. In one preferable solution, a same number of void subcarriers may be inserted between the pilot signals. The larger a quantity of the inserted void subcarriers is, the smaller a value of the ICI is.

Figure 2:
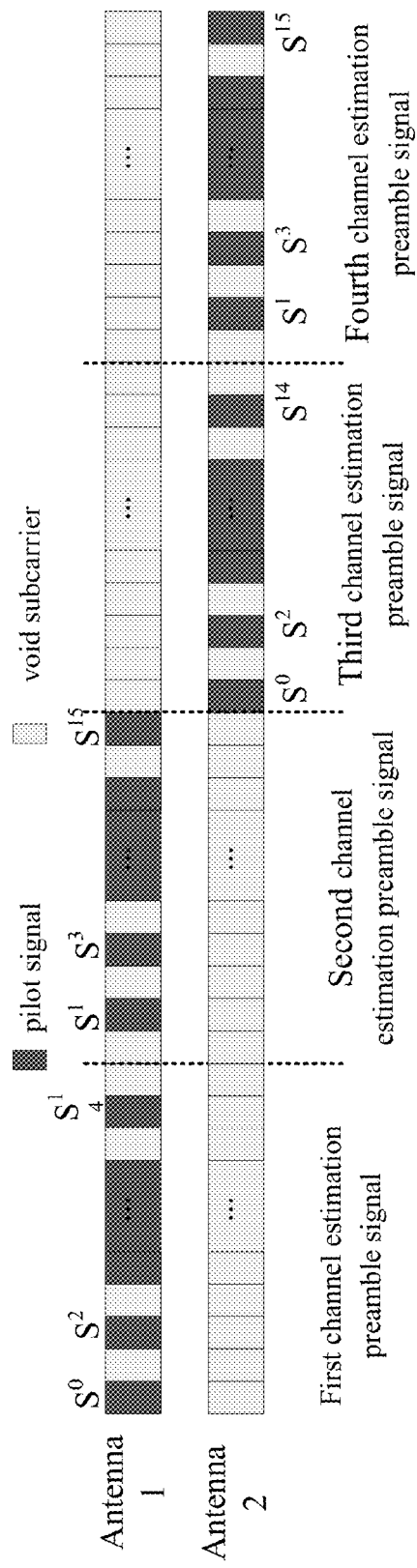
FIG. 2 is a schematic diagram of a transmission manner of a channel preamble signal in an embodiment of the present disclosure.

In embodiment two of the present disclosure, the method in the embodiment of the present disclosure is further illustrated by taking a system with 2×2 MIMO-OFDM and K=16 numbers of subcarriers as an example. In this case, M=2, and N=2. FIG. 2 is a schematic diagram of a transmission manner of channel preamble signals in an embodiment of the present disclosure. In FIG. 2, a void subcarrier is inserted between every two pilot signals, where $s^k \in \{-1, 1\}$, $\forall k \in \{0, ..., 15\}$.

Channel estimations as shown in formula (11) may be obtained according to formula (2).

$$\hat{H}_{n1}^k = \frac{y_n^k(1)}{s^k}, \forall n = \{1, 2\}, k \in \{0, 2 ..., 12, 14\}; \quad (11)$$

$$\hat{H}_{n1}^k = \frac{y_n^k(2)}{s^k}, \forall n = \{1, 2\}, k \in \{1, 3, ..., 13, 15\};$$

$$\hat{H}_{n2}^k = \frac{y_n^k(3)}{s^k}, \forall n = \{1, 2\}, k \in \{0, 2..., , 12, 14\};$$

$$\hat{H}_{n2}^k = \frac{y_n^k(4)}{s^k}, \forall n = \{1, 2\}, k \in \{1, 3, ..., 13, 15\};$$

Figure 4:
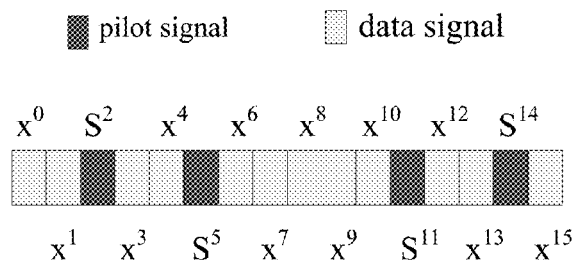
FIG. 4 is a schematic diagram of a pilot of a data symbol in an embodiment of the present disclosure.

FIG. 4 is a pilot schematic diagram of a data symbol in an embodiment of the present disclosure. In FIG. 4, four pilot signals are inserted into OFDM data symbols and are located on the $2^{nd}$, $5^{th}$, $11^{th}$ and $14^{th}$ subcarriers.

According to formula (7), since the $2^{nd}$ and the $14^{th}$ subcarriers transmit with the $1^{st}$ and the $3^{rd}$ channel estimation pilot signals, and the $5^{th}$ and the $11^{th}$ subcarriers transmit with the $2^{nd}$ and the $4^{th}$ channel estimation pilot signals, formula (12) may be obtained.

$$e^{j\hat{\theta}_{1,l}} = \left(\sum_{k=2, k=14} e^{j\hat{\theta}_{k_1,l}}\right)/2; e^{j\hat{\theta}_{3,l}} = \left(\sum_{k=2, k=14} e^{j\hat{\theta}_{k_2,l}}\right)/2; \quad (12)$$

$$e^{j\hat{\theta}_{2,l}} = \left(\sum_{k=5, k=11} e^{j\hat{\theta}_{k_1,l}}\right)/2; e^{j\hat{\theta}_{4,l}} = \left(\sum_{k=5, k=11} e^{j\hat{\theta}_{k_2,l}}\right)/2;$$

Finally, at the data demodulation stage, a signal compensation formula as shown in formula (13) may be determined according to formula (10).

$$\begin{bmatrix} \hat{x}_1^d \\ \hat{x}_2^d \end{bmatrix} = \begin{bmatrix} e^{-j\hat{\theta}_{d_1,l}} & 0 \\ 0 & e^{-j\hat{\theta}_{d_2,l}} \end{bmatrix} [[\hat{H}^d]^\dagger \hat{H}^d]^{-1} [\hat{H}^d]^\dagger \begin{bmatrix} y_1^d(l) \\ y_2^d(l) \end{bmatrix} \quad (13)$$

where $\hat{x}_i^d$, i=1,2, represents a demodulation signal on the $d^{th}$ data subcarrier.

In embodiment three of the present disclosure, the method in the embodiment of the present disclosure is further illustrated by taking a system with 2×2 MIMO-OFDM and K=64 numbers of subcarriers as an example. In this case, M=2, and N=2.

Figure 5:
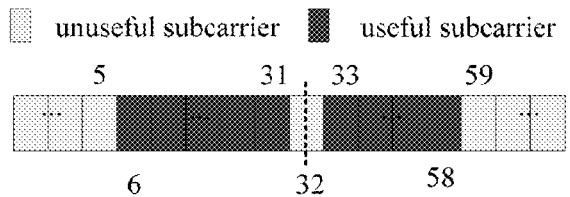
FIG. 5 is a schematic diagram of a functionality partition of subcarriers in an embodiment of the present disclosure.

FIG. 5 is a schematic diagram of functional partitioning of subcarriers in an embodiment of the present disclosure. There are only 52 useful subcarriers in 64 subcarriers, wherein the $0^{th}$ to the $5^{th}$ subcarriers and the $59^{th}$ to the $63^{rd}$ subcarriers are void subcarriers all the time and do not transmit any information, and the $32^{nd}$ subcarrier is a direct current subcarrier and does not transmit any information.

Figure 3:
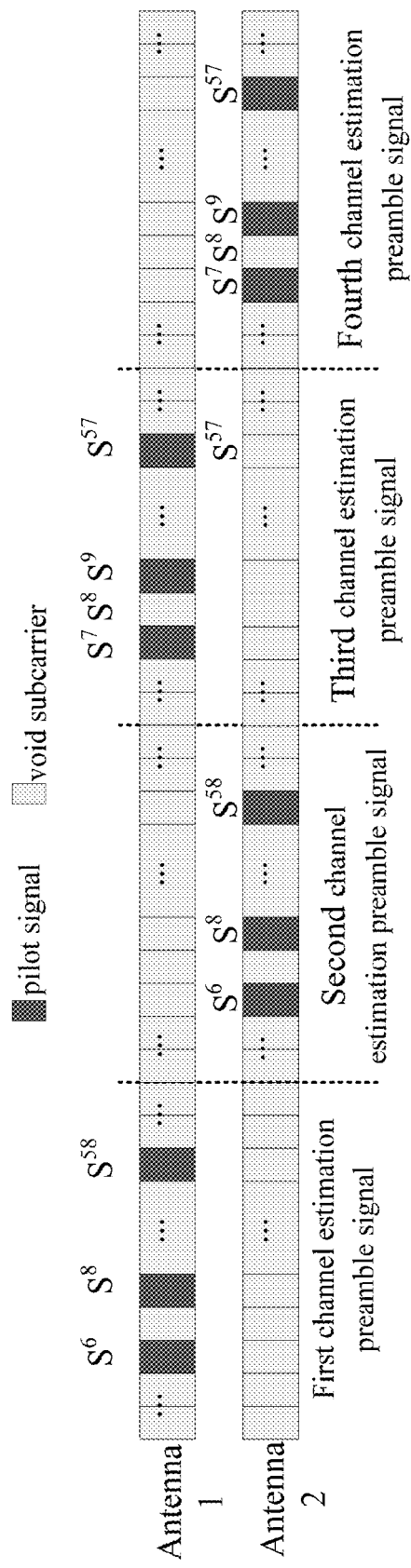
FIG. 3 is a schematic diagram of another transmission manner of a channel preamble signal in an embodiment of the present disclosure.

A schematic diagram of a transmission manner of a channel preamble signal in the embodiment of the present disclosure is as shown in FIG. 3, in which a void subcarrier is inserted between every two pilot signals, where $s^k \in \{-1, 1\}$, $\forall k \in \{6, \ldots, 31, 33, \ldots, 58\}$.

Channel estimations as shown in formula (14) may be obtained according to formula (2).

$$\hat{H}_{n1}^k = \frac{y_n^k(1)}{s^k}, \forall n = \{1, 2\}, k \in \{6, 8, \ldots, 30, 34, \ldots 58\}; \quad (14)$$

$$\hat{H}_{n2}^k = \frac{y_n^k(2)}{s^k}, \forall n = \{1, 2\}, k \in \{6, 8, \ldots, 30, 34, \ldots 58\};$$

$$\hat{H}_{n1}^k = \frac{y_n^k(3)}{s^k}, \forall n = \{1, 2\}, k \in \{7, 9, \ldots, 55, 57\};$$

$$\hat{H}_{n2}^k = \frac{y_n^k(4)}{s^k}, \forall n = \{1, 2\}, k \in \{7, 9, \ldots, 55, 57\};$$

Eight pilot signals are inserted into OFDM data symbols and are respectively located on subcarriers $P_1=\{10,22,42,54\}$ and subcarriers $P_2=\{13,25,39,51\}$.

According to formula (7), since the subcarrier $P_1$ transmits with the $1^{st}$ and the $2^{nd}$ channel estimation pilot signals, and the subcarrier $P_2$ transmits with the $3^{rd}$ and the $4^{th}$ channel estimation pilot signals, formula (15) may be obtained.

$$e^{j\hat{\theta}_{1,l}} = \left(\sum_{k \in P_1} e^{j\hat{\theta}_{k,1,l}}\right)/2; \; e^{j\hat{\theta}_{2,l}} = \left(\sum_{k \in P_1} e^{j\hat{\theta}_{k,2,l}}\right)/2; \quad (15)$$

$$e^{j\hat{\theta}_{3,l}} = \left(\sum_{k \in P_2} e^{j\hat{\theta}_{k,1,l}}\right)/2; \; e^{j\hat{\theta}_{4,l}} = \left(\sum_{k \in P_2} e^{j\hat{\theta}_{k,2,l}}\right)/2;$$

Formula (16) may be obtained according to formula (6).

$$\begin{bmatrix} e^{j\hat{\theta}_{k,1,l}} \\ e^{j\hat{\theta}_{k,2,l}} \end{bmatrix} \approx \begin{bmatrix} s_1^k & 0 \\ 0 & s_2^k \end{bmatrix} \left[[\hat{H}^k]^\dagger \hat{H}^k\right]^{-1} [\hat{H}^k]^\dagger \begin{bmatrix} y_1^k(l) \\ y_2^k(l) \end{bmatrix}, k \in \{P_1, P_2\} \quad (16)$$

Finally, at the data demodulation stage, a signal compensation formula as shown in formula (17) may be determined according to formula (10).

$$\begin{bmatrix} \hat{x}_1^d \\ \hat{x}_2^d \end{bmatrix} = \begin{bmatrix} e^{-j\hat{\theta}_{d_1,l}} & 0 \\ 0 & e^{-j\hat{\theta}_{d_2,l}} \end{bmatrix} \left[[\hat{H}^d]^\dagger \hat{H}^d\right]^{-1} [\hat{H}^d]^\dagger \begin{bmatrix} y_1^d(l) \\ y_2^d(l) \end{bmatrix} \quad (17)$$

where $\hat{x}_i^d$, i=1, 2, represents a demodulation signal on the $d^{th}$ data subcarrier.

Of course, the method in the embodiment of the present disclosure is not limited to the method as shown in the above-mentioned embodiment. No limitation is set to the number of the transmitting antennas, M, and the number of the receiving antennas, N, and meanwhile, and no limitation is set to the number of the subcarriers as well.

In the above-mentioned embodiments one to three, the M transmitting antennas of the transmitter are coherent, and the N receiving antennas of the receiver are also coherent.

Figure 6:
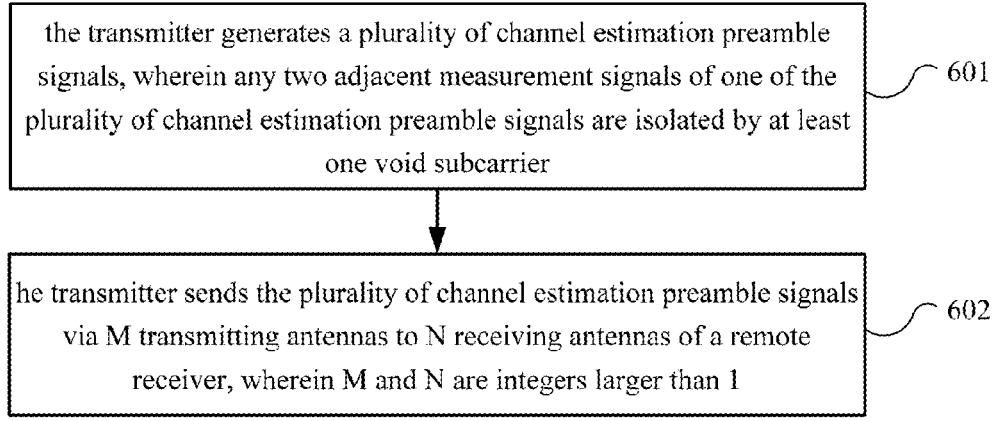
FIG. 6 is a flowchart of a method for sending a signal in an embodiment of the present disclosure.

FIG. 6 is a flowchart of a method for sending a signal in an embodiment of the present disclosure. The method shown in FIG. 6 is executed by a transmitter.

601, the transmitter generates a plurality of channel estimation preamble signals, wherein any two adjacent measurement signals of one of the plurality of channel estimation preamble signals are isolated by at least one void subcarrier.

602, the transmitter sends the plurality of channel estimation preamble signals via M transmitting antennas to N receiving antennas of a remote receiver, wherein M and N are integers larger than 1.

In the embodiment of the present disclosure, by inserting a void subcarrier between measurement signals in the transmitted channel estimation preamble signals, inter-carrier interference during reception at the receiver can be reduced.

Optionally, the sending, by the transmitter, the plurality of channel estimation preamble signals via the M transmitting antennas to the N receiving antennas of the remote receiver may include: sending, by the transmitter via the M transmitting antennas in turns, the plurality of channel estimation preamble signals to the N receiving antennas of the remote receiver, wherein any two transmitting antennas in the M transmitting antennas do not simultaneously send the plurality of channel estimation preamble signals. By sending the channel estimation preamble signals by the transmitting antennas in turns, inter-carrier interference during reception at the receiver can be further reduced.

Optionally, a subcarrier set for sending a measurement signal of the $m^{th}$ transmitting antenna in the M transmitting antennas is equal to a set of subcarriers of the $m^{th}$ transmitting antenna. By sending a measurement signal within a range of carriers of a transmitting antenna, the receiver is enabled to obtain the channel estimation parameters and the channel phase shift parameters over the full-band of the transmitting antenna.

Optionally, the measurement signal may include a pilot signal.

Figure 7:
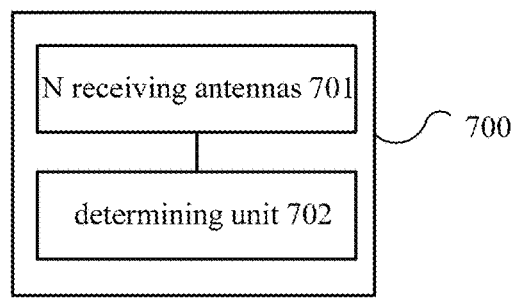
FIG. 7 is a schematic diagram of a structure of a receiver in an embodiment of the present disclosure.

FIG. 7 is a schematic diagram of a structure of a receiver 700 in an embodiment of the present disclosure. The receiver 700 may include a determining unit 702 and N receiving antennas 701.

The N receiving antennas 701 may receive a plurality of channel estimation preamble signals sent by M transmitting antennas of a remote transmitter.

The plurality of channel estimation preamble signals contain measurement signals of the M transmitting antennas of the remote transmitter, and M and N are integers larger than 1.

The determining unit 702 may determine channel estimation parameters and channel phase shift parameters from the M transmitting antennas of the remote transmitter to the N receiving antennas 701 of the receiver according to the measurement signals of the M transmitting antennas of the remote transmitter.

The determining unit 702 may further determine signal compensation from the M transmitting antennas of the remote transmitter to the N receiving antennas of the receiver according to the channel estimation parameters and the channel phase shift parameters.

In the embodiment of the present disclosure, the receiver 700 determines the channel estimation parameters and the channel phase shift parameters according to the measurement signals of the remote transmitter, and further determines the signal compensation, thereby improving accuracy of an estimated value of transmitted data.

In FIG. 7, although the N receiving antennas are represented by only one block diagram, it does not mean that the N receiving antennas must be a complete whole. The N receiving antennas may be a whole, or each of the N receiving antennas is an independent individual, or each of several of the N receiving antennas is an entirety, and no limitation is set herein by the embodiment of the present disclosure.

Optionally, a subcarrier set for sending a measurement signal of the $m^{th}$ transmitting antenna in the M transmitting antennas is equal to a set of subcarriers of the $m^{th}$ transmitting antenna, $\forall m=\{1,\ldots,M\}$. By sending the measurement signal on the entire range of carriers of a transmitting antenna, the receiver at the receiving end is enabled to obtain channel estimation parameters and channel phase shift parameters of all the subcarriers of the transmitting antenna.

Optionally, the measurement signal may include a pilot signal. Of course, a possibility of using other signal as the measurement signal is not excluded.

Optionally, when determining the channel estimation parameters and the channel phase shift parameters from the M transmitting antennas of the remote transmitter to the N receiving antennas 701 according to the measurement signals of the M transmitting antennas of the remote transmitter, the determining unit 702 may specifically determine at least one channel estimation parameter and at least one channel phase shift parameter for the $k^{th}$ subcarrier of the $m^{th}$ transmitting antenna according to at least one measurement signal on the $k^{th}$ subcarrier of the $m^{th}$ transmitting antenna, and determine an average value of the at least one channel estimation parameter for the $k^{th}$ subcarrier of the $m^{th}$ transmitting antenna and an average value of the at least one channel phase shift parameter for the $k^{th}$ subcarrier of the $m^{th}$ transmitting antenna as a channel estimation parameter and a channel phase shift parameter for the $k^{th}$ subcarrier of the $m^{th}$ transmitting antenna, wherein the $m^{th}$ transmitting antenna is one of the M transmitting antennas, $\forall m=\{1,\ldots,M\}$.

Optionally, when determining the channel estimation parameters and the channel phase shift parameters from the M transmitting antennas of the remote transmitter to the N receiving antennas 701 according to the measurement signals of the M transmitting antennas of the remote transmitter, the determining unit 702 may determine the channel estimation parameters from the M transmitting antennas of the remote transmitter to the N receiving antennas 701 according to measurement signals transmitted by the M transmitting antennas of the remote transmitter and measurement signals received by the N receiving antennas 701, and determine the channel phase shift parameters from the M transmitting antennas of the remote transmitter to the N receiving antennas 701 according to the measurement signals transmitted by the M transmitting antennas of the remote transmitter, the measurement signals received by the N receiving antennas 701 and the channel estimation parameters from the M transmitting antennas of the remote transmitter to the N receiving antennas 701.

Optionally, a formula for the determining unit 702 to determine the channel estimation parameters from the M transmitting antennas of the remote transmitter to the N receiving antennas 701 according to the measurement signals transmitted by the M transmitting antennas of the remote transmitter and the measurement signals transmitted by the N receiving antennas 701 is specifically shown in formula (18).

$$\hat{H}_{nm}^{k}=y_{n}^{k}(l)/s^{k}, \forall n=\{1,\ldots,N\}, k\in K \quad (18)$$

where $\hat{H}_{nm}^{k}$ represents a channel parameter for the $k^{th}$ subcarrier from the $m^{th}$ transmitting antenna of the remote transmitter to the $n^{th}$ receiving antenna in the N receiving antennas 701, $y_{n}^{k}(l)$ represents a measurement signal received by the $n^{th}$ receiving antenna in the N receiving antennas 701, $s^{k}$ represents a measurement signal sent on the $K^{th}$ subcarrier by the remote transmitter, and K represents a subcarrier set of the $m^{th}$ transmitting antenna of the remote transmitter.

A formula for the determining unit 702 to determine, according to the measurement signals transmitted by the M transmitting antennas of the remote transmitter, the measurement signals received by the N receiving antennas 701 and the channel estimation parameters from the M transmitting antennas of the remote transmitter to the N receiving antennas 701, the channel phase shift parameters from the M transmitting antennas of the remote transmitter to the N receiving antennas 701, is specifically shown in formula (19).

$$\begin{bmatrix} e^{j\tilde{\theta}_{k_1,l}} \\ \vdots \\ e^{j\tilde{\theta}_{k_M,l}} \end{bmatrix} = \begin{bmatrix} s_1^k & \cdots & 0 \\ \vdots & \vdots & \vdots \\ 0 & \cdots & s_M^k \end{bmatrix} \left[ [\hat{H}^k]^\dagger \hat{H}^k \right]^{-1} [\hat{H}^k]^\dagger \begin{bmatrix} y_1^k(l) \\ \vdots \\ y_N^k(l) \end{bmatrix} \quad (19)$$

where $e$ represents a channel phase shift parameter of the $m^{th}$ transmitting antenna of the remote transmitter, $y_{n}^{k}(l)$ represents a measurement signal received by the $n^{th}$ receiving antenna in the N receiving antennas 701, $s_{m}^{k}$ represents a measurement signal transmitted on the $k^{th}$ subcarrier by the $m^{th}$ transmitting antenna of the remote transmitter, and $[\hat{H}^k]^\dagger$ represents a conjugate matrix of $\hat{H}^k$, $\forall m=\{1,\ldots,M\}, \forall n=\{1,\ldots,N\}$.

Further, a formula for the determining unit 702 to determine the signal compensation from the M transmitting antennas of the remote transmitter to the N receiving antennas 701 according to the channel estimation parameters and the channel phase shift parameters is specifically shown in formula (20).

$$\begin{bmatrix} \hat{x}_1^d \\ \vdots \\ \hat{x}_M^d \end{bmatrix} = \begin{bmatrix} e^{-j\tilde{\theta}_{d_1,l}} & \cdots & 0 \\ \vdots & \vdots & \vdots \\ 0 & \cdots & e^{-j\tilde{\theta}_{d_M,l}} \end{bmatrix} \left[ [\hat{H}^d]^\dagger \hat{H}^d \right]^{-1} [\hat{H}^d]^\dagger \begin{bmatrix} y_1^d(l) \\ \vdots \\ y_N^d(l) \end{bmatrix} \quad (20)$$

where $\hat{x}_{m}^{d}$ represents a quadrature amplitude modulation (QAM) signal of the $d^{th}$ subcarrier transmitted by the $m^{th}$ transmitting antenna.

In addition, the receiver 700 may also execute the method in FIG. 1 and implement the functions of the receiver in the embodiment shown in FIG. 1, which will not be described redundantly herein in the embodiment of the present disclosure.

Figure 8:
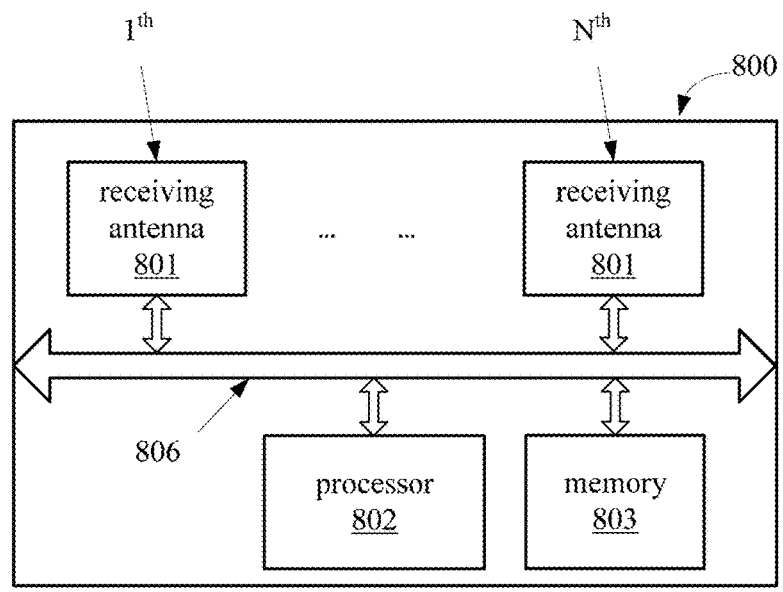
FIG. 8 is a schematic diagram of another structure of a receiver in an embodiment of the present disclosure.

FIG. 8 is a schematic diagram of a structure of a receiver 800 in an embodiment of the present disclosure. The receiver 800 may include a processor 802, a memory 803 and N receiving antennas 801.

The N receiving antennas 801 may receive a plurality of channel estimation preamble signals sent by M transmitting antennas of a remote transmitter.

The plurality of channel estimation preamble signals contain measurement signals of the M transmitting antennas of the remote transmitter, and M and N are integers larger than 1.

The processor 802 may determine channel estimation parameters and channel phase shift parameters from the M transmitting antennas of the remote transmitter to the N receiving antennas 801 of the receiver according to the measurement signals of the M transmitting antennas of the remote transmitter, and determine signal compensation from the M transmitting antennas of the remote transmitter to the N receiving antennas of the receiver according to the channel estimation parameters and the channel phase shift parameters.

The memory 803 may store an instruction for the processor 802 to determine the channel estimation parameters and the channel phase shift parameters from the M transmitting antennas of the remote transmitter to the N receiving antennas 801 of the receiver according to the measurement signals of the M transmitting antennas of the remote transmitter, and determine the signal compensation from the M transmitting antennas of the remote transmitter to the N receiving antennas of the receiver according to the channel estimation parameters and the channel phase shift parameters.

In the embodiment of the present disclosure, the receiver 800 determines the channel estimation parameters and the channel phase shift parameters according to the measurement signals of the remote transmitter, so as to determine the signal compensation and improve accuracy of an estimated value of transmitted data.

The processor 802 controls an operation of the receiver 800, and the processor 802 may also be referred to as a CPU (central processing unit). The memory 803 may include a read-only memory and a random access memory, and provide an instruction and data to the processor 802. A part of the memory 803 may further include a nonvolatile random access memory (NVRAM). Respective components of the receiver 800 are coupled together by a bus system 806, wherein besides a data bus, the bus system 806 may further include a power source bus, a control bus, a status signal bus and the like. But for clarity of illustration, various buses in the figure are marked as the bus system 806.

The method disclosed in the above-mentioned embodiment of the present disclosure may be applied to the processor 802, or may be implemented by the processor 802. The processor 802 may be an integrated circuit chip with a signal processing capability. In an implementation process, the respective steps of the above-mentioned method may be completed by an integrated logic circuit of hardware in the processor 802 or an instruction in a form of software. The above-mentioned processor 802 may be a general-purpose processor, a digital signal processor (DSP), an application-specific integrated circuit (ASIC), a field-programmable gate array (FPGA) or other programmable logic device, a discrete gate or a transistor logic device, or a discrete hardware component, and may implement or execute respective methods, steps and logic block diagrams disclosed in the embodiment of the present disclosure. The general-purpose processor may be a microprocessor or may be any conventional processor or the like. The steps of the method disclosed in the embodiment of the present disclosure may be directly executed and completed by a hardware decoding processor, or is executed and completed by a combination of hardware and software modules in the decoding processor. The software module may be located in a mature storage medium in the art, such as a random access memory, a flash memory, a read-only memory, a programmable read-only memory or an electrically erasable programmable memory, a register, etc. The storage medium is located in the memory 803, and the processor 802 reads the information in the memory 803 and completes the steps of the above-mentioned method in combination with the hardware thereof.

Optionally, a subcarrier set for sending a measurement signal of the $m^{th}$ transmitting antenna in the M transmitting antennas is equal to a set of subcarriers of the $M^{th}$ transmitting antenna. By sending the measurement signal on the entire range of carriers of a transmitting antenna, the receiver at the receiving end may obtain the channel estimation parameters and the channel phase shift parameters of all the subcarriers of the transmitting antenna.

Optionally, the measurement signal may include a pilot signal. Of course, a possibility of using other signal as the measurement signal is not excluded.

Optionally, when determining the channel estimation parameters and the channel phase shift parameters from the M transmitting antennas of the remote transmitter to the N receiving antennas 801 according to the measurement signals of the M transmitting antennas of the remote transmitter, the processor 802 may specifically determine at least one channel estimation parameter and at least one channel phase shift parameter of the $m^{th}$ transmitting antenna on the $k^{th}$ subcarrier according to at least one measurement signal of the $m^{th}$ transmitting antenna on the $k^{th}$ subcarrier, and determine an average value of the at least one channel estimation parameter and an average value of the at least one channel phase shift parameter of the $m^{th}$ transmitting antenna on the $k^{th}$ subcarrier as the channel estimation parameter and the channel phase shift parameter of the $m^{th}$ transmitting antenna on the $k^{th}$ subcarrier, wherein the $m^{th}$ transmitting antenna is one of the M transmitting antennas, $\forall m=\{1,\ldots,M\}$.

Optionally, when determining the channel estimation parameters and the channel phase shift parameters from the M transmitting antennas of the remote transmitter to the N receiving antennas 801 according to the measurement signals of the M transmitting antennas of the remote transmitter, the processor 802 may determine the channel estimation parameters from the M transmitting antennas of the remote transmitter to the N receiving antennas 801 according to measurement signals transmitted by the M transmitting antennas of the remote transmitter and measurement signals received by the N receiving antennas 801, and determine the channel phase shift parameters from the M transmitting antennas of the remote transmitter to the N receiving antennas 801 according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas 801.

Optionally, a formula for the processor 802 to determine the channel estimation parameters from the M transmitting antennas of the remote transmitter to the N receiving antennas 801 according to measurement signals transmitted by the M transmitting antennas of the remote transmitter and measurement signals received by the N receiving antennas 801 is specifically as shown in formula (21).

$$\hat{H}_{nm}^{k}=y_n^k(l)/s^k, \forall n=\{1,\ldots,N\}, k\in K \qquad (21)$$

where $\hat{H}_{nm}^{k}$ represents a channel parameter on the $k^{th}$ subcarrier from the $m^{th}$ transmitting antenna of the remote transmitter to the $n^{th}$ receiving antenna in the N receiving antennas 801, $y_n^k(l)$ represents a measurement signal received by the $n^{th}$ receiving antenna in the N receiving antennas 801, $s^k$ represents a measurement signal sent on the $k^{th}$ subcarrier by the remote transmitter, and K represents a set of subcarriers of the $m^{th}$ transmitting antenna of the remote transmitter.

A formula for the processor 802 to determine the channel phase shift parameters from the M transmitting antennas of the remote transmitter to the N receiving antennas 801 according to the measurement signals transmitted by the M transmitting antennas of the remote transmitter, the measurement signals received by the N receiving antennas of the receiver, and the channel estimation parameters from the M transmitting antennas of the remote transmitter to the N receiving antennas 801 is specifically as shown in formula (22).

$$\begin{bmatrix} e^{j\hat{\theta}_{k_1,l}} \\ \vdots \\ e^{j\hat{\theta}_{k_M,l}} \end{bmatrix} = \begin{bmatrix} s_1^k & \cdots & 0 \\ \vdots & \vdots & \vdots \\ 0 & \cdots & s_M^k \end{bmatrix} \left[[\hat{H}^k]^\dagger \hat{H}^k\right]^{-1} [\hat{H}^k]^\dagger \begin{bmatrix} y_1^k(l) \\ \vdots \\ y_N^k(l) \end{bmatrix} \quad (22)$$

where $e^{j\hat{\theta}_{k_m,l}}$ represents a channel phase shift parameter of the $m^{th}$ transmitting antenna of the remote transmitter, $y_n^k(l)$ represents a measurement signal received by the $n^{th}$ receiving antenna in the N receiving antennas 801, $s_m^k$ represents a measurement signal transmitted on the $k^{th}$ subcarrier by the $m^{th}$ transmitting antenna of the remote transmitter, and $[\hat{H}^k]^\dagger$ represents a conjugate matrix of $\hat{H}^k$, $\forall n=\{1,\ldots,N\}$.

Further, a formula for the processor 802 to determine the signal compensation from the M transmitting antennas of the remote transmitter to the N receiving antennas 801 according to the channel estimation parameters and the channel phase shift parameters is specifically as shown in formula (23).

$$\begin{bmatrix} \hat{x}_1^d \\ \vdots \\ \hat{x}_M^d \end{bmatrix} = \begin{bmatrix} e^{-j\hat{\theta}_{d_1,l}} & \cdots & 0 \\ \vdots & \vdots & \vdots \\ 0 & \cdots & e^{-j\hat{\theta}_{d_M,l}} \end{bmatrix} \left[[\hat{H}^d]^\dagger \hat{H}^d\right]^{-1} [\hat{H}^d]^\dagger \begin{bmatrix} y_1^d(l) \\ \vdots \\ y_N^d(l) \end{bmatrix} \quad (23)$$

where $\hat{x}_m^d$ represents a quadrature amplitude modulation (QAM) signal on the $d^{th}$ subcarrier transmitted by the $m^{th}$ transmitting antenna.

In addition, the receiver 800 may also execute the method in FIG. 1 and implement the functions of the receiver in the embodiment shown in FIG. 1, which will not be described in detain redundantly herein in the embodiment of the present disclosure.

Figure 9:
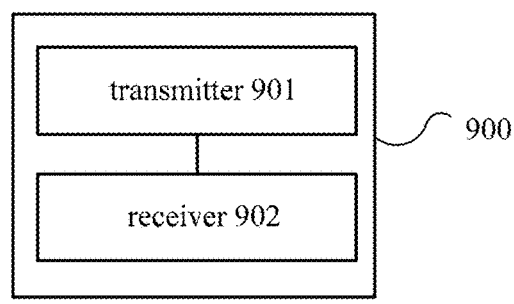
FIG. 9 is a schematic diagram of a structure of an MIMO-OFDM system in an embodiment of the present disclosure.

FIG. 9 is a schematic diagram of a structure of an MIMO-OFDM system 900 in an embodiment of the present disclosure. The MIMO-OFDM system 900 may include a transmitter 901 and a receiver 902.

The receiver 902 may be the receiver 700 shown in FIG. 7 or the receiver 800 shown in FIG. 8. The transmitter 901 is used for sending, via M transmitting antennas in turns, a plurality of channel estimation preamble signals to N receiving antennas of the receiver 902. The plurality of channel estimation preamble signals contain measurement signals of the M transmitting antennas of the transmitter 901, where M and N are integers larger than 1.

In the embodiment of the present disclosure, the MIMO-OFDM system 900 determines channel estimation parameters and channel phase shift parameters according to the measurement signals of the remote transmitter, and further determines signal compensation for the receiving end, thereby improving accuracy of an estimated value of transmitted data.

Optionally, a subcarrier set for sending a measurement signal of the $m^{th}$ transmitting antenna in the M transmitting antennas is equal to a set of subcarriers of the $m^{th}$ transmitting antenna, where $\forall m=\{1,\ldots,M\}$. By sending the measurement signal on an entire range of carriers of one transmitting antenna, a receiver at a receiving end is enabled to obtain the channel estimation parameters and the channel phase shift parameters of all subcarriers of the transmitting antenna.

Optionally, the measurement signal may include a pilot signal. Of course, a possibility of using other signal as the measurement signal is not excluded.

Optionally, any two adjacent measurement signals of one of the plurality of channel estimation preamble signals are isolated by at least one void subcarrier, and the void subcarrier is used for reducing inter-carrier interference (ICI) during reception at the receiver.

Optionally, any two transmitting antennas in the M transmitting antennas do not simultaneously send the plurality of channel estimation preamble signals.

In the embodiment as shown in FIG. 1, specifically, prior to step 102 and after step 101, the method may further include: receiving, by the receiver via the N receiving antennas, data signals and second pilot signals sent on a first data symbol by the M transmitting antennas. Step 102 may be specifically implemented as follows: the receiver determines the channel estimation parameters from the M transmitting antennas to the N receiving antennas according to first pilot signals of the M transmitting antennas contained in the plurality of channel estimation preamble signals, and determines the channel phase shift parameters from the M transmitting antennas to the N receiving antennas according to signals arrived at the N receiving antennas which come from the second pilot signals sent on the first data symbol by the M transmitting antennas. Step 103 may be specifically implemented as follows: the receiver determines the signal compensation for the data signals arrived at the N receiving antennas that are sent on the first data symbol by the M transmitting antennas according to the channel estimation parameters from the M transmitting antennas to the N receiving antennas and the channel phase shift parameters from the M transmitting antennas to the N receiving antennas. In this case, the method in the embodiment of the present disclosure may be as shown in FIG. 10.

Figure 10:
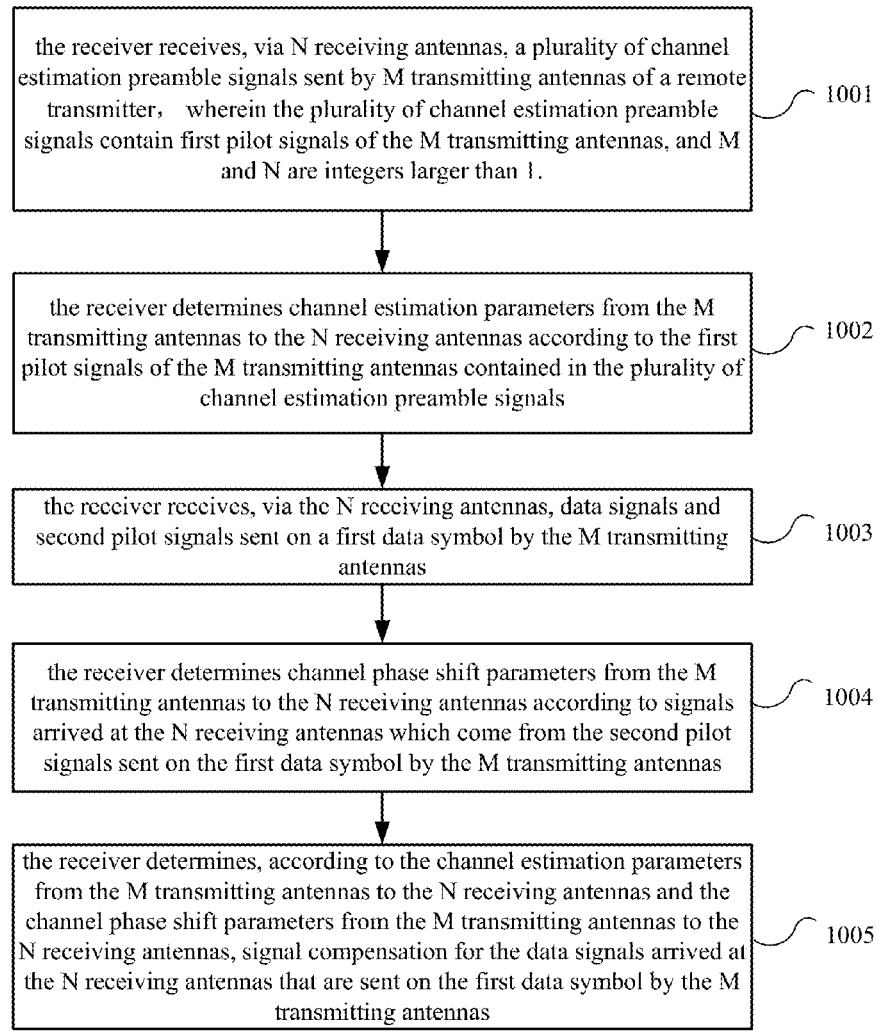
FIG. 10 is a flowchart of another method for signal compensation in an embodiment of the present disclosure.

FIG. 10 is a flowchart of a method for signal compensation in an embodiment of the present disclosure. The method shown in FIG. 10 is executed by a receiver. The receiver mentioned herein refers to a receiving end device of an MIMO-OFDM system, and may be a base station, a mobility management entity (MME), a gateway or other network element, which is not limited in the embodiment of the present disclosure. The method includes the following steps.

1001, the receiver receives, via N receiving antennas, a plurality of channel estimation preamble signals sent by M transmitting antennas of a remote transmitter.

The plurality of channel estimation preamble signals contain first pilot signals of the M transmitting antennas, and M and N are integers larger than 1.

1002, the receiver determines channel estimation parameters from the M transmitting antennas to the N receiving antennas according to the first pilot signals of the M transmitting antennas contained in the plurality of channel estimation preamble signals.

1003, the receiver receives, via the N receiving antennas, data signals and second pilot signals sent on a first data symbol by the M transmitting antennas.

1004, the receiver determines channel phase shift parameters from the M transmitting antennas to the N receiving antennas according to signals arrived at the N receiving antennas which come from the second pilot signals sent on the first data symbol by the M transmitting antennas.

1005, the receiver determines, according to the channel estimation parameters from the M transmitting antennas to the N receiving antennas and the channel phase shift parameters from the M transmitting antennas to the N receiving antennas, signal compensation for the data signals arrived at the N receiving antennas that are sent on the first data symbol by the M transmitting antennas.

In the embodiment of the present disclosure, the receiver determines the signal compensation of the data signals according to the channel estimation parameters from the transmitting antennas of the remote transmitter to the receiving antennas of the receiver and the channel phase shift parameters of the transmitting antennas of the remote transmitter on the first data symbol, which can improve demodulation accuracy of transmitted data to a certain extent.

Optionally, a subcarrier set for sending a first pilot signal of the $m^{th}$ transmitting antenna in the M transmitting antennas is equal to a set of subcarriers of the $m^{th}$ transmitting antenna, $\forall m = \{1, \ldots, M\}$.

Optionally, as one embodiment, the N receiving antennas are coherent, and the M transmitting antennas are coherent.

In an embodiment where both the receiver and the transmitter are coherent, step 1004 may be implemented as follows: the receiver determines, according to a signal arrived at the N receiving antennas which comes from a second pilot signal sent on the first data symbol by the $m^{th}$ transmitting antenna in the M transmitting antennas, channel phase shift parameters from the $m^{th}$ transmitting antenna in the M transmitting antennas to the N receiving antennas, where $\forall m = \{1, \ldots, M\}$.

Further, the determining, by the receiver, the channel phase shift parameters from the $m^{th}$ transmitting antenna in the M transmitting antennas to the N receiving antennas, according to the signal arrived at the N receiving antennas which comes from the second pilot signal sent on the first data symbol by the $m^{th}$ transmitting antenna in the M transmitting antennas, may be specifically implemented as follows: if there is more than one subcarrier on the first data symbol for sending the second pilot signal, determining, by the receiver according to signals arrived at the N receiving antennas which come from the second pilot signals sent on a plurality of subcarriers of the first data symbol by the $m^{th}$ transmitting antenna in the M transmitting antennas, multiple groups of channel phase shift parameters from the $m^{th}$ transmitting antenna in the M transmitting antennas to the N receiving antennas, and determining average values of the multiple groups of channel phase shift parameters as the channel phase shift parameters from the $m^{th}$ transmitting antenna in the M transmitting antennas to the N receiving antennas.

In this case, step 1005 may be expressed by the following formula (24).

$$\begin{bmatrix} \hat{x}_1^k \\ \vdots \\ \hat{x}_M^k \end{bmatrix} = \begin{bmatrix} e^{-j\hat{\theta}_{k_1,l}} & \cdots & 0 \\ \vdots & \ddots & \vdots \\ 0 & \cdots & e^{-j\hat{\theta}_{k_M,l}} \end{bmatrix} \left[ [\hat{H}^k]^\dagger \hat{H}^k \right]^{-1} [\hat{H}^k]^\dagger \begin{bmatrix} y_1^k(l) \\ \vdots \\ y_N^k(l) \end{bmatrix} \quad (24)$$

wherein, $\hat{x}_m^k$ represents a data signal obtained from a demodulation performed by the receiver that is transmitted on the $k^{th}$ subcarrier of the $l^{th}$ data symbol by the $m^{th}$ transmitting antenna, $y_n^k(l)$ represents a pilot signal arrived at the $n^{th}$ receiving antenna of the receiver which comes from a data signal transmitted on the $k^{th}$ subcarrier of the $l^{th}$ data symbol by the M transmitting antennas, $\forall m = \{1, \ldots, M\}$, $\forall n = \{1, \ldots, N\}$, $\hat{H}^k$ represents a channel estimation parameter matrix on the $k^{th}$ subcarrier between the M transmitting antennas and the N receiving antennas, $[\hat{H}^k]^\dagger$ represents a conjugate matrix of $\hat{H}^k$, $\hat{H}_{nm}^k$ in $\hat{H}^k$ represents a channel estimation parameter on the $k^{th}$ subcarrier between the $m^{th}$ transmitting antenna of the remote transmitter and the $n^{th}$ receiving antenna of the receiver, and $\hat{H}_{nm}^k$ may be expressed by formula (25).

$$\hat{H}_{nm}^k = y_n^k(t)/s^k, \forall n = \{1, \ldots, N\}, k \in K \quad (25)$$

where K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $$\begin{bmatrix} e^{j\hat{\theta}_{k_1,l}} \\ \vdots \\ e^{j\hat{\theta}_{k_M,l}} \end{bmatrix}$$

represents channel phase shift parameters for signals arrived at the N receiving antennas which are sent on the $k^{th}$ subcarrier of the data symbol by the M transmitting antennas, and $$\begin{bmatrix} e^{j\hat{\theta}_{k_1,l}} \\ \vdots \\ e^{j\hat{\theta}_{k_M,l}} \end{bmatrix}$$

may be expressed by formula (26).

$$\begin{bmatrix} e^{j\hat{\theta}_{k_1,l}} \\ \vdots \\ e^{j\hat{\theta}_{k_M,l}} \end{bmatrix} = \begin{bmatrix} s_1^k & \cdots & 0 \\ \vdots & \ddots & \vdots \\ 0 & \cdots & s_M^k \end{bmatrix} \left[ [H^k]^\dagger H^k \right]^{-1} [H^k]^\dagger \begin{bmatrix} y_1^k(l) \\ \vdots \\ y_N^k(l) \end{bmatrix} \quad (26)$$

where $s_m^k$ represents a pilot signal transmitted on the $k^{th}$ subcarrier by the $m^{th}$ transmitting antenna of the remote transmitter, $y_n^k(l)$ represents a pilot signal arrived at the $n^{th}$ receiving antenna of the receiver which comes from a pilot signal sent on the $k^{th}$ subcarrier of the $1^{th}$ data symbol by the M transmitting antennas, and $e$ represents a channel phase shift parameter for the signal arrived at the N receiving antennas that is sent on the $k^{th}$ subcarrier of the $1^{th}$ data symbol by the $m^{th}$ transmitting antenna of the remote transmitter.

Optionally, as another embodiment, the N receiving antennas are incoherent, and/or the M transmitting antennas are incoherent.

Optionally, in an embodiment where the receiver and/or the transmitter is incoherent, step 1004 may be implemented as follows: the receiver determines the channel phase shift parameters from the M transmitting antennas to the N receiving antennas according to all of pilot signals arrived at the N receiving antennas which come from the second pilot signals sent on the first data symbol by the M transmitting antennas, wherein a quantity of pilot subcarriers where all the pilot signals are located is not smaller than M.

In this case, step 1005 may be expressed by the following formula (27):

$$\begin{bmatrix} \hat{x}_1^k \\ \vdots \\ \hat{x}_M^k \end{bmatrix} = [[\hat{H}_\xi^k]^\dagger \hat{H}_\xi^k]^{-1} [\hat{H}_\xi^k]^\dagger \begin{bmatrix} y_1^k(l) \\ \vdots \\ y_N^k(l) \end{bmatrix} \quad (27)$$

wherein $\hat{x}_m^k$ represents a data signal obtained from a demodulation performed by the receiving terminal that is transmitted on the $k^{th}$ subcarrier of the $1^{th}$ data symbol by the $m^{th}$ transmitting antenna, $y_n^k(l)$ represents a signal arrived at the $n^{th}$ receiving antenna of the receiver which comes from a data signal transmitted on the $k^{th}$ subcarrier of the $1^{th}$ data symbol by the M transmitting antennas, $\forall m=\{1, \ldots, M\}$, $\forall n=\{1, \ldots, N\}$, $[H_\xi^k]^\dagger$ represents a conjugate matrix of $H_\xi^k$, and $H_\xi^k$ may be expressed by formula (28).

$$H_\xi^k = \begin{bmatrix} \hat{H}_{11}^k e^{j\xi_{11}} & \cdots & \hat{H}_{1M}^k e^{j\xi_{1M}} \\ \vdots & \vdots & \vdots \\ \hat{H}_{N1}^k e^{j\xi_{N1}} & \cdots & \hat{H}_{NM}^k e^{j\xi_{NM}} \end{bmatrix} \quad (28)$$

$\hat{H}_{nm}^k$ in $H_\xi^k$ represents a channel estimation parameter on the $k^{th}$ subcarrier between the $m^{th}$ transmitting antenna of the remote transmitter and the $n^{th}$ receiving antenna of the receiver, and may be expressed by formula (29).

$$\hat{H}_{nm}^k = y_n^k(t)/s^k, \forall n=\{1, \ldots, N\}, k \in K \quad (29)$$

where K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix}$$

represents channel phase shift parameters for signals arrived at the N receiving antennas that are sent on the $1^{th}$ data symbol by the M transmitting antennas, and $$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix}$$

may be expressed by formula (30).

$$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix} = \left[ \begin{bmatrix} \tilde{H}^{p_1} \\ \vdots \\ \tilde{H}^{p_{|P|}} \end{bmatrix}^\dagger \begin{bmatrix} \tilde{H}^{p_1} \\ \vdots \\ \tilde{H}^{p_{|P|}} \end{bmatrix} \right]^{-1} \begin{bmatrix} \tilde{H}^{p_1} \\ \vdots \\ \tilde{H}^{p_{|P|}} \end{bmatrix}^\dagger \begin{bmatrix} y_1^{P_1}(l) \\ \vdots \\ y_N^{P_1}(l) \\ y_1^{P_2}(l) \\ \vdots \\ y_N^{P_{|P|}}(l) \end{bmatrix} \quad (30)$$

where $y_n^P(l)$ represents a pilot signal arrived at the N receiving antennas which comes from a pilot signal transmitted on a pilot subcarrier p of the $1^{th}$ data symbol by the M transmitting antennas, p represents any pilot subcarrier in a pilot subcarrier set $\{p_1, \ldots p_{|P|}\}$ of the $1^{th}$ data symbol, and $\hat{H}^P$ may be expressed by formula (31).

$$\tilde{H}^P = \begin{bmatrix} \hat{H}_{11}^P s_1^P & \cdots & \hat{H}_{1M}^P s_M^P & 0 & \cdots & 0 & 0 & \cdots & 0 \\ 0 & \cdots & 0 & \hat{H}_{21}^P s_1^P & \cdots & \hat{H}_{2M}^P s_M^P & \vdots & \cdots & \vdots \\ \vdots & \cdots & \vdots & \vdots & \vdots & \vdots & 0 & \cdots & 0 \\ 0 & \cdots & 0 & 0 & \cdots & 0 & \hat{H}_{N1}^P s_1^P & \cdots & \hat{H}_{NM}^P s_M^P \end{bmatrix} \quad (31)$$

Optionally, in another embodiment where the receiver and/or the transmitter is incoherent, step 1004 may be implemented as follows: the receiver determines, according to at least one group of pilot signals arrived at the $n^{th}$ receiving antenna in the N receiving antennas which come from the second pilot signals sent on the first data symbol by the M transmitting antennas, channel phase shift parameters from the M transmitting antennas to the $n^{th}$ receiving antenna in the N receiving antennas, wherein each group of pilot signals in the at least one group of pilot signals contains pilot signals received on J numbers of subcarriers by the N receiving antennas, and a value of J is not smaller than M.

In this case, step 1005 may be expressed by the following formula (32):

$$\begin{bmatrix} \hat{x}_1^k \\ \vdots \\ \hat{x}_M^k \end{bmatrix} = [[\hat{H}_\xi^k]^\dagger \hat{H}_\xi^k]^{-1} [\hat{H}_\xi^k]^\dagger \begin{bmatrix} y_1^k(l) \\ \vdots \\ y_N^k(l) \end{bmatrix} \quad (32)$$

where $\hat{x}_m^k$ represents a data signal obtained by a receiving terminal by demodulation that is transmitted on the $k^{th}$ subcarrier of the $1^{th}$ data symbol by the $m^{th}$ transmitting antenna, $y_n^k(l)$ represents a pilot signal arrived at the $n^{th}$ receiving antenna of the receiver which comes from a pilot signal sent on the $k^{th}$ subcarrier of the $1^{th}$ data symbol by the M transmitting antennas, $\forall m=\{1,\ldots,M\}$, $\forall n=\{1,\ldots,N\}$, $[\mathbf{H}_\xi^k]^\dagger$ represents a conjugate matrix of $\mathbf{H}_\xi^k$, and $\mathbf{H}_\xi^k$ may be expressed by formula (33).

$$\hat{H}_\xi^k = \begin{bmatrix} \hat{H}_{11}^k e^{j\xi_{11}} & \ldots & \hat{H}_{1M}^k e^{j\xi_{1M}} \\ \vdots & \vdots & \vdots \\ \hat{H}_{N1}^k e^{j\xi_{N1}} & \ldots & \hat{H}_{NM}^k e^{j\xi_{NM}} \end{bmatrix} \quad (33)$$

$\hat{H}_{nm}^k$ in $\mathbf{H}_\xi^k$ represents the channel estimation parameter between the $m^{th}$ transmitting antenna of the remote transmitter and the $n^{th}$ receiving antenna of the receiver on the $k^{th}$ subcarrier, and may be expressed by formula (34):

$$\hat{\mathbf{H}}_{nm}^k = y_n^k(t)/s^k, \forall n=\{1,\ldots,N\}, k \in K \quad (34)$$

where K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver which comes from a pilot signal on the $k^{th}$ subcarrier in the $t^{th}$ channel estimation preamble signal of the remote transmitter, $e^{j\xi_n}$ represents a channel phase shift parameter from the M transmitting antennas to the $n^{th}$ receiving antenna in the N receiving antennas, and may be expressed by formula (35).

$$e^{j\xi_n} = \left[ \begin{bmatrix} \hat{H}_{n1}^{J_1} s_1^{J_1} & \ldots & \hat{H}_{nM}^{J_1} s_M^{J_1} \\ \vdots & \ldots & \vdots \\ \hat{H}_{n1}^{J_{|J|}} s_1^{J_{|J|}} & \ldots & \hat{H}_{nM}^{J_{|J|}} s_M^{J_{|J|}} \end{bmatrix}^\dagger \begin{bmatrix} \hat{H}_{n1}^{J_1} s_1^{J_1} & \ldots & \hat{H}_{nM}^{J_1} s_M^{J_1} \\ \vdots & \ldots & \vdots \\ \hat{H}_{n1}^{J_{|J|}} s_1^{J_{|J|}} & \ldots & \hat{H}_{nM}^{J_{|J|}} s_M^{J_{|J|}} \end{bmatrix} \right]^{-1} \quad (35)$$

$$\begin{bmatrix} \hat{H}_{n1}^{J_1} s_1^{J_1} & \ldots & \hat{H}_{nM}^{J_1} s_M^{J_1} \\ \vdots & \ldots & \vdots \\ \hat{H}_{n1}^{J_{|J|}} s_1^{J_{|J|}} & \ldots & \hat{H}_{nM}^{J_{|J|}} s_M^{J_{|J|}} \end{bmatrix}^\dagger \begin{bmatrix} y_n^{J_1}(l) \\ \vdots \\ y_n^{J_{|J|}}(l) \end{bmatrix}$$

where $y_n^J(l)$ represents a pilot signal arrived at the $n^{th}$ receiving antenna in the N receiving antennas which comes from a pilot signal transmitted on the pilot subcarrier J of the $l^{th}$ data symbol by the M transmitting antennas, J represents any pilot subcarrier in a pilot subcarrier set $\{J_1, \ldots J_{|J|}\}$ of the $l^{th}$ data symbol, and $s_m^J$ represents a pilot signal transmitted on the pilot subcarrier J of the $l^{th}$ data symbol by the $m^{th}$ transmitting antenna in the M transmitting antennas.

Further, the determining, by the receiver according to at least one group of pilot signals arrived at the $n^{th}$ receiving antenna in the N receiving antennas which come from the second pilot signals sent on the first data symbol by the M transmitting antennas, channel phase shift parameters from the M transmitting antennas to the $n^{th}$ receiving antenna in the N receiving antennas, may be specifically implemented as follows: the receiver determines multiple groups of channel phase shift parameters from the M transmitting antennas to the $n^{th}$ receiving antenna in the N receiving antennas according to multiple groups of pilot signals arrived at the nth receiving antenna in the N receiving antennas which come from the second pilot signals sent on the first data symbol by the M transmitting antennas, and determines an average value of channel phase shift parameters in the multiple groups of channel phase shift parameters corresponding to a channel phase shift parameter from the $m^{th}$ transmitting antenna in the M transmitting antennas to the $n^{th}$ receiving antenna in the N receiving antennas as a channel phase shift parameter from the $m^{th}$ transmitting antenna in the M transmitting antennas to the $n^{th}$ receiving antenna in the N receiving antennas.

Optionally, any two adjacent measurement signals of one of the plurality of channel estimation preamble signals are isolated by at least one void subcarrier. No matter in an application scenario where both the receiver and the transmitter are coherent, or in an application scenario where the receiver and/or the transmitter is incoherent, the transmitting end inserts the void subcarrier into channel estimation preamble symbols to reduce inter-carrier interference (ICI), and the receiving end may obtain a more accurate channel estimation parameter by utilizing a simple channel estimation method.

The methods in FIG. 1 and FIG. 10 may be applicable to the scenario with coherent receiving and sending, such as, for example, embodiments one to three in the present disclosure. In addition, the methods in FIG. 1 and FIG. 10 may also be applicable to the scenario with non-coherent receiving and sending. An application of the methods in FIG. 1 and FIG. 10 in the scenario with non-coherent receiving and sending will be described below in detail in combination with specific embodiments.

In embodiment four of the present disclosure, the N receiving antennas of the receiver are incoherent, or the M transmitting antennas of the remote transmitter are incoherent, or the N receiving antennas of the receiver and the M transmitting antennas of the remote transmitter are incoherent. It is assumed that the transmitter of the MIMO-OFDM system sends the $l^{th}$ channel estimation preamble signal on the $m^{th}$ transmitting antenna, where a pilot signal in the channel estimation preamble signal is used as the measurement signal, a subcarrier set for sending the pilot signal is K, then on the $k^{th}$ subcarrier, where $k \in K$, signals of the N receiving antennas may be expressed by formula (36).

$$\begin{bmatrix} y_1^k(l) \\ \vdots \\ y_N^k(l) \end{bmatrix} = \begin{bmatrix} e^{j\varphi_1} & \ldots & 0 \\ \vdots & \ldots & \vdots \\ 0 & \ldots & e^{j\varphi_N} \end{bmatrix} \underbrace{\begin{bmatrix} H_{11}^k & \ldots & H_{1M}^k \\ \vdots & \ldots & \vdots \\ H_{N1}^k & \ldots & H_{NM}^k \end{bmatrix}}_{H^k} \quad (36)$$

$$\begin{bmatrix} 0 \\ \vdots \\ 0 \\ e^{j\theta_m} s^k \\ 0 \\ \vdots \\ 0 \end{bmatrix} + ICI + z$$

$$= \begin{bmatrix} H_{1m}^k e^{j(\varphi_1+\theta_m)} s^k \\ \vdots \\ H_{Nm}^k e^{j(\varphi_N+\theta_m)} s^k \end{bmatrix} + ICI_l + z_l$$

where $\begin{bmatrix} y_1^k(l) \\ \vdots \\ y_N^k(l) \end{bmatrix}$ represents the $l^{th}$ channel estimation preamble signal received by the N receiving antennas of the receiver; on the $k^{th}$ subcarrier, received on the $k^{th}$ subcarrier by the N receiving antennas of the receiver;

$$\underbrace{\begin{bmatrix} H_{11}^k & \cdots & H_{1M}^k \\ \vdots & \cdots & \vdots \\ H_{N1}^k & \cdots & H_{NM}^k \end{bmatrix}}_{H^k}$$

represents channel parameters from the M transmitting antennas of the transmitter to the N receiving antennas of the receiver, $s^k$ represents a pilot signal of the $k^{th}$ subcarrier, $e^{j\theta_l}$ represents a phase shift on receiving antenna n caused by phase noise, $e^{j\theta_m}$ represents a phase shift on transmitting antenna m caused by phase noise, $ICI_l$ represents intercarrier interference of the $l^{th}$ channel estimation preamble signal, and $z_l$ represents a noise of the $l^{th}$ channel estimation preamble signal.

According to LS estimation, the channel estimation parameters $\{\hat{H}_{nm}^k, \forall n,m\}$ from the transmitting antenna m to the receiving antenna n may be obtained, which are as shown in formula (37).

$$\hat{H}_{nm}^k = \frac{y_n^k(l)}{s^k} \approx H_{nm}^k e^{j(\varphi_n + \theta_m)}, \tag{37}$$

$$\forall n = \{1, \ldots, N\}, \forall m = \{1, \ldots, M\}, k \in K$$

In order to represent all of channel estimations of the $k^{th}$ subcarrier, namely $\{\hat{H}_{nm}^k, \forall n,m\}$, it is assumed that the $m^{th}$ antenna sends with $k_m$ numbers of channel estimation preamble signals and the $k^{th}$ subcarrier is a subcarrier for sending a pilot signal, then a channel estimation of the $k^{th}$ subcarrier may be expressed by formula (38).

$$\hat{H}_{nm}^k \approx H_{nm}^k e^{j(\varphi_{k_m} + \theta_{k_m})}, \forall n = \{1, \cdots, N\}, \forall m = \{1, \cdots, M\} \tag{38}$$

where $H_{nm}^k$ represents an actual channel parameter from the transmitting antenna m to the receiving antenna n. In this case, the actual channel parameter $\mathbf{H}^k$ from the M transmitting antennas to the N receiving antennas may be expressed by formula (39).

$$H^k = \begin{bmatrix} H_{11}^k & \cdots & H_{1m}^k & \cdots & H_{1M}^k \\ \vdots & \cdots & H_{nm}^k & \cdots & \vdots \\ H_{N1}^k & \cdots & H_{Nm}^k & \cdots & H_{NM}^k \end{bmatrix}, \tag{39}$$

$$\forall n = \{1, \ldots, N\}, \forall m = \{1, \ldots, M\}, k \in K$$

At a data demodulation stage, it is necessary to track a phase shift caused by a phase noise and a frequency offset. Specifically, a pilot signal may be inserted into an OFDM data symbol, and the phase shift is estimated via the pilot signal. Receiving signals on the $k^{th}$ pilot subcarrier of the $l^{th}$ OFDM data symbol may be expressed by formula (40).

$$\begin{bmatrix} y_1^k(l) \\ \vdots \\ y_N^k(l) \end{bmatrix} = \begin{bmatrix} e^{j\phi_1} & \cdots & 0 \\ \vdots & \cdots & \vdots \\ 0 & \cdots & e^{j\phi_N} \end{bmatrix} H^k \begin{bmatrix} e^{j\psi_1} & \cdots & 0 \\ \vdots & \cdots & \vdots \\ 0 & \cdots & e^{j\psi_M} \end{bmatrix} \begin{bmatrix} s_1^k \\ \vdots \\ s_m^k \end{bmatrix} + ICI_l + z_l \tag{40}$$

where $\phi_n$ represents a phase shift angle caused by the phase noise of the receiving antenna n at the data modulation stage, and $\Psi_m$ represents a phase shift angle caused by the phase noise of the transmitting antenna m at the data modulation stage.

The formulas (38) and (39) are substituted into formula (40) to obtain formula (41).

$$\begin{bmatrix} y_1^k(l) \\ \vdots \\ y_N^k(l) \end{bmatrix} \approx \begin{bmatrix} \sum_{m=1}^M \hat{H}_{1m}^k s_m^k e^{j\xi_{1m}} \\ \vdots \\ \sum_{m=1}^M \hat{H}_{Nm}^k s_m^k e^{j\xi_{Nm}} \end{bmatrix} + ICI_l + z_l \tag{41}$$

In the first estimation method in the embodiment of the present disclosure, all the pilot subcarriers are utilized for estimation. In this case, formula (41) may be modified into a form as shown in formula (42).

$$\begin{bmatrix} y_1^k(l) \\ \vdots \\ y_N^k(l) \end{bmatrix} \approx \tag{42}$$

$$\underbrace{\begin{bmatrix} \hat{H}_{11}^k s_1^k & \cdots & \hat{H}_{1M}^k s_M^k & 0 & \cdots & 0 & 0 & \cdots & 0 \\ 0 & \cdots & 0 & \hat{H}_{21}^k s_1^k & \cdots & \hat{H}_{2M}^k s_1^k & \vdots & \cdots & \vdots \\ \vdots & \cdots & \vdots & \vdots & \vdots & \vdots & 0 & \cdots & 0 \\ 0 & \cdots & 0 & 0 & \cdots & 0 & \hat{H}_{N1}^k s_1^k & \cdots & \hat{H}_{NM}^k s_M^k \end{bmatrix}}_{H^k} \underbrace{\begin{bmatrix} e^{j\xi_{11}} \\ \vdots \\ e^{j\xi_{1M}} \\ e^{j\xi_{21}} \\ \vdots \\ e^{j\xi_{NM}} \end{bmatrix}}_{e^{j\xi}} + ICI_l + z_l$$

It is assumed that a set of all the pilot subcarriers is $p = \{p_1, \ldots, p_{|p|}\}$, wherein $|p|$ represents a cardinal number of the set P. Receiving data of all the pilot subcarriers are merged to obtain formula (43).

$$\begin{bmatrix} y_1^{p_1}(l) \\ \vdots \\ y_N^{p_1}(l) \\ y_1^{p_2}(l) \\ \vdots \\ y_N^{p_{|P|}}(l) \end{bmatrix}_{\tilde{y}} = \underbrace{\begin{bmatrix} \tilde{H}^{p_1} \\ \vdots \\ \tilde{H}^{p_{|P|}} \end{bmatrix}}_{\tilde{H}} e^{j\xi} + ICI_l + z_l \qquad (43)$$

By utilizing the LS estimation method, a channel phase shift parameter $e^{j\xi}$ from the M transmitting antennas to the N receiving antennas may be expressed by formula (44).

$$e^{j\xi} = \left[ [\tilde{H}]^{\dagger} \tilde{H} \right]^{-1} [\tilde{H}]^{\dagger} \tilde{y} \qquad (44)$$

Specifically, a complete formula of the formula (44) is as shown by formula (45).

$$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix} = \left[ \begin{bmatrix} \tilde{H}^{p_1} \\ \vdots \\ \tilde{H}^{p_{|P|}} \end{bmatrix}^{\dagger} \begin{bmatrix} \tilde{H}^{p_1} \\ \vdots \\ \tilde{H}^{p_{|P|}} \end{bmatrix} \right]^{-1} \begin{bmatrix} \tilde{H}^{p_1} \\ \vdots \\ \tilde{H}^{p_{|P|}} \end{bmatrix}^{\dagger} \begin{bmatrix} y_1^{p_1}(l) \\ \vdots \\ y_N^{p_1}(l) \\ y_1^{p_2}(l) \\ \vdots \\ y_N^{p_{|P|}}(l) \end{bmatrix} \qquad (45)$$

where $y_n^p(l)$ represents a pilot signal arrived at the N receiving antennas which comes from a pilot signal transmitted on a pilot subcarrier p of the $l^{th}$ data symbol by the M transmitting antennas, p represents any pilot subcarrier in a pilot subcarrier set $\{p_1, \ldots p_{|p|}\}$ of the $l^{th}$ data symbol, where $\tilde{H}^p$ satisfies formula (46).

$$\tilde{H}^P = \begin{bmatrix} \hat{H}_{11}^p s_1^p & \cdots & \hat{H}_{1M}^p s_M^p & 0 & \cdots & 0 & 0 & \cdots & 0 \\ 0 & \cdots & 0 & \hat{H}_{21}^p s_1^p & \cdots & \hat{H}_{2M}^p s_M^p & \vdots & \cdots & \vdots \\ \vdots & \cdots & \vdots & \vdots & \vdots & \vdots & 0 & \cdots & 0 \\ 0 & \cdots & 0 & 0 & \cdots & 0 & \hat{H}_{N1}^p s_1^p & \cdots & \hat{H}_{NM}^p s_M^p \end{bmatrix} \qquad (46)$$

In the second estimation method in the embodiment of the present disclosure, the channel phase shift parameters of the $n^{th}$ receiving antenna are respectively estimated.

Specifically, $\xi_1 = \{\xi_{11}, \ldots, \xi_{1M}\}, \ldots, \xi_N = \{\xi_{N1}, \ldots, \xi_{NM}\}$ are respectively estimated. Receiving signals of $|\mathcal{J}|$ numbers of pilot subcarriers of the $n^{th}$ receiving antenna are combined, namely $\mathcal{J} = \{J_1, \ldots, J_{|\mathcal{J}|}\} \subseteq p$, and formula (47) is obtained as follows:

$$\begin{bmatrix} y_n^{J_1} \\ \vdots \\ y_n^{J_{|\mathcal{J}|}} \end{bmatrix} \approx \underbrace{\begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|\mathcal{J}|}} s_1^{J_{|\mathcal{J}|}} & \cdots & \hat{H}_{nM}^{J_{|\mathcal{J}|}} s_M^{J_{|\mathcal{J}|}} \end{bmatrix}}_{\ddot{H}_n} \underbrace{\begin{bmatrix} e^{j\xi_{n1}} \\ \vdots \\ e^{j\xi_{nM}} \end{bmatrix}}_{e^{j\xi_n}} + ICI_l + z_l \qquad (47)$$

By utilizing the LS estimation method, a channel phase shift parameter $e^{j\xi_n}$ from the M transmitting antennas to the $n^{th}$ receiving antenna may be expressed by formula (48).

$$e^{j\xi_n} = \left[ [\ddot{H}_n]^{\dagger} \ddot{H}_n \right]^{-1} [\ddot{H}_n]^{\dagger} \begin{bmatrix} y_n^{J_1} \\ \vdots \\ y_n^{J_{|\mathcal{J}|}} \end{bmatrix} \qquad (48)$$

Specifically, a complete formula of the formula (48) is as shown by formula (49).

$$e^{j\xi_n} = \left[ \begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|\mathcal{J}|}} s_1^{J_{|\mathcal{J}|}} & \cdots & \hat{H}_{nM}^{J_{|\mathcal{J}|}} s_M^{J_{|\mathcal{J}|}} \end{bmatrix}^{\dagger} \begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|\mathcal{J}|}} s_1^{J_{|\mathcal{J}|}} & \cdots & \hat{H}_{nM}^{J_{|\mathcal{J}|}} s_M^{J_{|\mathcal{J}|}} \end{bmatrix} \right]^{-1} \qquad (49)$$

$$\begin{bmatrix} \hat{H}_{n1}^{J_1} s_1^{J_1} & \cdots & \hat{H}_{nM}^{J_1} s_M^{J_1} \\ \vdots & \cdots & \vdots \\ \hat{H}_{n1}^{J_{|\mathcal{J}|}} s_1^{J_{|\mathcal{J}|}} & \cdots & \hat{H}_{nM}^{J_{|\mathcal{J}|}} s_M^{J_{|\mathcal{J}|}} \end{bmatrix}^{\dagger} \begin{bmatrix} y_n^{J_1}(l) \\ \vdots \\ y_n^{J_{|\mathcal{J}|}}(l) \end{bmatrix}$$

where $y_n^J(l)$ represents a pilot signal arrived at the $n^{th}$ receiving antenna in the N receiving antennas which comes from a pilot signal transmitted on the pilot subcarrier J of the $l^{th}$ data symbol by the M transmitting antennas, J represents any pilot subcarrier in a pilot subcarrier set $\{J_1, \ldots J_{|\mathcal{J}|}\}$ of the $l^{th}$ data symbol, and $s_m^J$ represents a pilot signal transmitted by the $m^{th}$ transmitting antenna in the M transmitting antennas on pilot subcarrier J of the $l^{th}$ data symbol.

It should be noted that, such method only needs to perform matrix inversion on $|\mathcal{J}| \times |\mathcal{J}|$. $|\mathcal{J}| \geq M$ is necessary. Therefore, a range value of $|J|$ is $M > |J| > P$. The larger the $|J|$ is, the more difficult the estimation is, but the higher the complexity is.

In addition, if the system supports a plurality of different J, different values of $e^{j\xi_n}$ are estimated, and estimation accuracy may be improved by an averaging method. For example, it is assumed that there are T numbers of J in total: $J(1), \ldots, J(T)$, $e^{j\xi_n(1)}, \ldots, e^{j\xi_n(T)}$ are respectively estimated, and then the channel phase shift parameter $e^{j\xi_n}$ from the M transmitting antennas to the $n^{th}$ receiving antenna may be expressed by formula (50).

$$e^{j\xi_n} = \frac{e^{j\xi_n(1)} + \ldots + e^{j\xi_n(T)}}{T} \qquad (50)$$

After the channel phase shift parameter $e^{j\xi_n}$ from the $m^{th}$ transmitting antennas to the $n^{th}$ receiving antenna is estimated by the two above-mentioned methods, a corresponding phase shift angle $\xi_{nm}$ may be further obtained through the Euler formula.

After the phase shift caused by the phase noise is tracked, it is necessary to compensate data. Specifically, at the data demodulation stage, received signals on the $d^{th}$ data subcarrier of the $l^{th}$ OFDM data symbol may be expressed by formula (51).

$$\begin{bmatrix} y_1^d(l) \\ \vdots \\ y_N^d(l) \end{bmatrix} = \underbrace{\begin{bmatrix} \hat{H}_{11}^d e^{j\xi_{11}} & \cdots & \hat{H}_{1M}^d e^{j\xi_{1M}} \\ \vdots & \vdots & \vdots \\ \hat{H}_{N1}^d e^{j\xi_{N1}} & \cdots & \hat{H}_{NM}^d e^{j\xi_{NM}} \end{bmatrix}}_{\hat{H}_\xi^d} \begin{bmatrix} x_1^d(l) \\ \vdots \\ x_M^d(l) \end{bmatrix} + ICI_l + z_l \quad (51)$$

where $x_m^d(l)$ represents a QAM signal transmitted by the $m^{th}$ transmitting antenna on the $d^{th}$ subcarrier. The $e^{j\xi_{nm}}$ obtained by calculating according to formula (45), (49) or (50) is substituted into formula (51), or after the $e^{j\xi_{nm}}$ is obtained by calculating according to formula (45), (49) or (50), is further obtained according to the Euler formula and the $\xi_{nm}$ is then substituted into formula (51). By utilizing the LS estimation method, a signal compensation formula expressed by formula (52) may be obtained.

$$\begin{bmatrix} \hat{x}_1^d(l) \\ \vdots \\ \hat{x}_M^d(l) \end{bmatrix} = [[H_\xi^d]^\dagger H_\xi^d]^{-1} [H_\xi^d]^\dagger \begin{bmatrix} y_1^d(l) \\ \vdots \\ y_N^d(l) \end{bmatrix} \quad (52)$$

where $\hat{x}_m^d(l)$ represents a QAM signal transmitted by the $m^{th}$ transmitting antenna on the $d^{th}$ subcarrier. $\mathbf{H}_\xi^d$ is expressed by formula (53).

$$H_\xi^d = \begin{bmatrix} \hat{H}_{11}^d e^{j\xi_{11}} & \cdots & \hat{H}_{1M}^d e^{j\xi_{1M}} \\ \vdots & \vdots & \vdots \\ \hat{H}_{N1}^d e^{j\xi_{N1}} & \cdots & \hat{H}_{NM}^d e^{j\xi_{NM}} \end{bmatrix} \quad (53)$$

where $\widetilde{H}_{nm}^d$ in $\mathbf{H}_\xi^d$ represents a channel estimation parameter from the $m^{th}$ transmitting antenna on the remote transmitter to the $n^{th}$ receiving antenna of the receiver on the $d^{th}$ data subcarrier, and may be calculated by formula (37).

It should be noted that, in formula (36) to formula (53), a serial number of a subcarrier is represented sometimes by d and sometimes by k, and all of these are serial numbers of subcarriers; different characters are adopted merely for distinguishing a data signal from a pilot signal. A pilot signal $s^k$ in a pilot subcarrier is known at the receiving end, while a data signal $x^d$ in a data subcarrier d is unknown at the receiving end and is the data that needs to be demodulated.

In addition, in order to reduce inter-carrier interference (Inter-Carrier Interference, ICI), when the transmitting antennas of the transmitter are sending the channel estimation preamble signals, a void subcarrier may be inserted between the pilot signals. In one preferable solution, a same number of void subcarriers may be inserted between the pilot signals. The larger a quantity of the inserted void subcarriers is, the smaller a value of the ICI is.

In embodiment five of the present disclosure, the method in the embodiment of the present disclosure is further illustrated by taking a system with 2×2 MIMO-OFDM and K=16 numbers of subcarriers as an example. In this case, M=2, and N=2. In addition, two receiving antennas of the receiver are incoherent, or two transmitting antennas of the remote transmitter are incoherent, or two receiving antennas of the receiver and two transmitting antennas of the remote transmitter are both incoherent.

FIG. 11 is a schematic diagram of another transmission manner of a channel preamble signal in an embodiment of the present disclosure. In the embodiment of the present disclosure, a manner for the two transmitting antennas to transmit channel estimation preamble signals in turns is as shown in FIG. 11. Transmitting antenna 1 transmits the first channel estimation preamble signal and does not transmit on the second channel estimation preamble signal; transmitting antenna 2 transmits the second channel estimation preamble signal and does not transmit on the first channel estimation preamble signal, where $s^k \in \{-1,1\}$, $\forall k \in \{0, \ldots, 15\}$.

Through formula (37), channel estimations may be obtained as shown in formula (54).

$$\hat{H}_{n1}^k = \frac{y_n^k(1)}{s^k} \approx H_{n1}^k e^{j(\varphi_n + \theta_1)}, \forall n = \{1, 2\}, k \in K \quad (54)$$

$$\hat{H}_{n2}^k = \frac{y_n^k(2)}{s^k} \approx H_{n2}^k e^{j(\varphi_n + \theta_2)}, \forall n = \{1, 2\}, k \in K$$

where $y_n^k(l)$ represents a received signal on the $k^{th}$ subcarrier of the $l^{th}$ channel preamble signal by $n^{th}$ receiving antenna.

At a data transmission stage, the transmitter may insert four pilot signals into OFDM data symbols, which are located on the $2^{nd}$, $5^{th}$, $11^{th}$ and $14^{th}$ subcarriers, that is p={2,5,11,14}. A specific transmission is as shown in FIG. 4.

By adopting the first method for phase tracking and estimation, formula (55) may be obtained according to formula (44).

$$\begin{bmatrix} e^{j\xi_{11}} \\ e^{j\xi_{12}} \\ e^{j\xi_{21}} \\ e^{j\xi_{22}} \end{bmatrix} = [[\tilde{H}]^\dagger \tilde{H}]^{-1} [\tilde{H}]^\dagger \begin{bmatrix} y_1^2 \\ y_2^2 \\ y_1^5 \\ y_2^5 \\ y_1^{11} \\ y_2^{11} \\ y_1^{14} \\ y_2^{14} \end{bmatrix} \quad (55)$$

Please refer to the expressions in formula (43) and formula (42) for the specific meaning of $\hat{\mathbf{H}}$, which will not be described in detain redundantly herein.

After the channel phase shift parameters $e^{j\xi_{11}}$, $e^{j\xi_{12}}$, $e^{j\xi_{21}}$, $e^{j\xi_{22}}$ between the two transmitters and the two receivers of corresponding data symbols are obtained according to formula (55), channel phase shift angles $\{\xi_{11}, \xi_{12}, \xi_{21}, \xi_{22}\}$ may be further obtained.

Finally, at a data demodulation stage, the receiver performs signal compensation on received data signals. Formula (56) is obtained according to the formula (52).

$$\begin{bmatrix} \hat{x}_1^d \\ \hat{x}_2^d \end{bmatrix} = [[H_\xi^d]^\dagger H_\xi^d]^{-1} [H_\xi^d]^\dagger \begin{bmatrix} y_1^d(l) \\ y_2^d(l) \end{bmatrix} \quad (56)$$

where $\hat{x}_1^d$ and $\hat{x}_2^d$ respectively represent QAM signals sent on the $d^{th}$ data subcarrier of the $l^{th}$ data symbol by the transmitting antenna 1 and the transmitting antenna 2. $y_1^d(l)$ and $y_2^d(l)$ respectively represent QAM signals received on the $d^{th}$ data subcarrier of the $l^{th}$ data symbol by the receiving antenna 1 and the receiving antenna 2. In addition, it can be seen from the formula (53) that, a value of $\mathbf{H}_\xi^d$ may be calculated through the channel estimation parameters in formula (54) and the channel phase shift parameters in formula (55), which will not be described redundantly herein in the embodiment of the present disclosure.

In the embodiment of the present disclosure, the channel estimation parameters are determined according to the pilot signals in the channel estimation preamble channel, and the channel phase shift parameters are determined according to all the pilot signals sent on a data symbol, thereby determining the signal compensation of the data signals on the data symbol according to the channel estimation parameters and the channel phase shift parameters.

In embodiment six of the present disclosure, the method in the embodiment of the present disclosure is further illustrated by taking a MIMO-OFDM WiFi system with 2×2 and K=64 numbers of subcarriers as an example. In this case, M=2, and N=2. In addition, two receiving antennas of the receiver are incoherent, or two transmitting antennas of the remote transmitter are incoherent, or two receiving antennas of the receiver and two transmitting antennas of the remote transmitter are both incoherent.

In the 2×2 MIMO-OFDM WiFi system, there are K=64 subcarriers in total. There are only 52 useful subcarriers in 64 subcarriers, wherein the $0^{th}$ to the $5^{th}$ subcarriers and the $59^{th}$ to the $63^{rd}$ subcarriers are void subcarriers all the time and do not transmit any information, and the $32^{nd}$ subcarrier is a direct current subcarrier and does not transmit any information. Please refer to FIG. 5 for details.

In the embodiment of the present disclosure, a manner for the two transmitting antennas to transmit the channel estimation preamble signals in turns may be as shown in FIG. 11. Transmitting antenna 1 transmits the first channel estimation preamble signal and does not transmit on the second channel estimation preamble signal; and transmitting antenna 2 transmits the second channel estimation preamble signal and does not transmit on the first channel estimation preamble signal, where $s^k \in \{-1,1\}$, $\forall k \in \{0, \ldots, 15\}$.

Through formula (37), channel estimations may be obtained as shown in formula (57).

$$\hat{H}_{n1}^k = \frac{y_n^k(1)}{s^k} \approx H_{n1}^k e^{j(\varphi_n + \theta_1)}, \forall n = \{1, 2\}, k \in K \quad (57)$$

$$\hat{H}_{n2}^k = \frac{y_n^k(2)}{s^k} \approx H_{n2}^k e^{j(\varphi_n + \theta_2)}, \forall n = \{1, 2\}, k \in K$$

where $y_n^k(l)$ represents a received signal on the $k^{th}$ subcarrier of the $l^{th}$ channel preamble signal by $n^{th}$ receiving antenna.

At a data transmission stage, the transmitter may insert 8 pilot signals into OFDM data symbols, which are located on the $10^{th}$, $13^{th}$, $22^{nd}$, $25^{th}$, $39^{th}$, $42^{nd}$, $51^{st}$ and $54^{th}$ subcarriers, that is, p={10,13,22,25,39,42,51,54}.

The second method for phase tracking and estimation is adopted. It is assumed that there are T=4 numbers of J in total: J(1)={10,54}, J(2)={13,51}, J(3)={22,42}, J(4)={25, 39}. The system may select any pilot subcarrier set among J(1), J(2), J(3), J(4) to determine the channel phase shift parameters. Of course, the system may also select other pilot subcarrier set to determine the channel phase shift parameters, such as, for example, J(5)={22,42,39} and the like, as long as a cardinal number |J(i)| of a pilot subcarrier set J(i) is larger than or equal to the number (i.e., 2) of the transmitting antennas and is smaller than or equal to the number (i.e., 8) of all the pilot subcarriers. In the embodiment of the present disclosure, one pilot subcarrier set J(i) may be selected to estimate $e^{j\xi_n(i)}$ according to formula (48); or, a plurality of pilot subcarrier sets J(i) may be selected to estimate a plurality of $e^{j\xi_n(i)}$ according to formula (48), and $e^{j\xi_n}$ is then obtained according to formula (50).

In the embodiment of the present disclosure, as an example, the channel phase shift parameters are estimated with T={J(1), J(2), J(3), J(4)}.

According to formula (48), $e^{j\xi_n(1)}, \ldots, e^{j\xi_n(T)}$ are respectively estimated. According to formula (50), $e^{j\xi_n}$ is then obtained, which is further used to obtain $\{\xi_{11}, \xi_{12}, \xi_{21}, \xi_{22}\}$.

Finally, at a data demodulation stage, the receiver performs signal compensation on the received data signals. Formula (58) is obtained according to formula (52).

$$\begin{bmatrix} \hat{x}_1^d \\ \hat{x}_2^d \end{bmatrix} = \left[[H_\xi^d]^\dagger H_\xi^d\right]^{-1} [H_\xi^d]^\dagger \begin{bmatrix} y_1^d(l) \\ y_2^d(l) \end{bmatrix} \quad (58)$$

where $\hat{x}_1^d$ and $\hat{x}_2^d$ respectively represent QAM signals sent on the $d^{th}$ data subcarrier of the $l^{th}$ data symbol by the transmitting antenna 1 and the transmitting antenna 2. $y_1^d(l)$ and $y_2^d(l)$ respectively represent QAM signals received on the $d^{th}$ data subcarrier of the $l^{th}$ data symbol by the receiving antenna 1 and the receiving antenna 2. In addition, it can be seen from the formula (53) that, a value of $\mathbf{H}_\xi^d$ may be calculated through the channel estimation parameters in formula (54) and the channel phase shift parameters in formula (55). which will not be described redundantly herein in the embodiment of the present disclosure.

In the embodiment of the present disclosure, the channel estimation parameters are determined according to the pilot signals in the channel estimation preamble channel, and the channel phase shift parameters are determined according to all the pilot signals sent on a data symbol, thereby determining the signal compensation of the data signals on the data symbol according to the channel estimation parameters and the channel phase shift parameters.

In addition, although only the QAM signal is adopted at the data sending stage in embodiments one to six of the present disclosure, embodiments one to six of the present disclosure are actually not limited to use the QAM signal and may adopt other categories of data signal, such as, for example, a binary phase shift keying (BPSK) signal, a quadrature phase shift keying (QPSK) signal, etc.

FIG. 12 is a flowchart of a method for sending a signal in an embodiment of the present disclosure. The method in FIG. 12 is executed by a transmitter.

1201, the transmitter sends, via M transmitting antennas, a plurality of channel estimation preamble signals to N receiving antennas of a remote receiver.

The plurality of channel estimation preamble signals contain first pilot signals of the M transmitting antennas, where M and N are integers larger than 1. The first pilot signals in the plurality of channel estimation preamble signals are used by the remote receiver for determining channel estimation parameters from the M transmitting antennas to the N receiving antennas, and each one of the plurality of channel estimation preamble signals is separately transmitted by one transmitting antenna in the M transmitting antennas.

1202, the transmitter sends, via the M transmitting antennas, data signals and second pilot signals on a data symbol.

The second pilot signals are used by the remote receiver for determining channel phase shift parameters from the M transmitting antennas to the N receiving antennas, and further determining signal compensation of the data signals according to the channel estimation parameters and the channel phase shift parameters.

In the embodiment of the present disclosure, the transmitter sends, via multiple paths of transmitting antennas, the channel estimation preamble signals to multiple antennas of the receiver and sends the data signals and the pilot signals on the data symbol, such that the receiver is able to determine the channel estimation parameters and the channel phase shift parameters between the transmitting antennas and the receiving antennas according to the pilot signals in the channel estimation preamble signals and the pilot signals on the data symbol, and further determine the signal compensation of the data signals on the data symbol.

Optionally, any two adjacent measurement signals of one of the plurality of channel estimation preamble signals are isolated by at least one void subcarrier.

Optionally, one or more subcarriers on the data symbol are used for sending the second pilot signals.

Optionally, the M transmitting antennas of the transmitter are coherent or incoherent.

In addition, the method in the embodiment of the present disclosure may also be applied to the transmitter in embodiments one to six of the present disclosure, which will not be described redundantly herein in the embodiment of the present disclosure.

Figure 13:
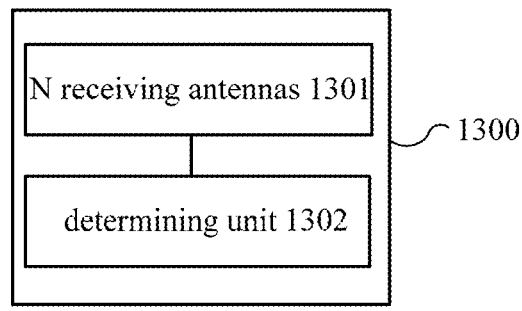
FIG. 13 is a schematic diagram of another structure of a receiver in an embodiment of the present disclosure.

FIG. 13 is a schematic diagram of a structure of a receiver 1300 in an embodiment of the present disclosure. The receiver 1300 may include N receiving antennas 1301 and a determining unit 1302.

The N receiving antennas 1301 are configured to receive a plurality of channel estimation preamble signals sent by M transmitting antennas of a remote transmitter.

The plurality of channel estimation preamble signals contain first pilot signals of the M transmitting antennas, where M and N are integers larger than 1.

The determining unit 1302 is configured to determine channel estimation parameters from the M transmitting antennas to the N receiving antennas according to the first pilot signals of the M transmitting antennas contained in the plurality of channel estimation preamble signals.

The N receiving antennas 1301 are further configured to receive data signals and second pilot signals sent on a first data symbol by the M transmitting antennas.

The determining unit 1302 is further configured to determine channel phase shift parameters from the M transmitting antennas to the N receiving antennas 1301 according to signals arrived at the N receiving antennas 1301 which come from the second pilot signals sent on the first data symbol by the M transmitting antennas.

The determining unit 1302 is further configured to determine, according to the channel estimation parameters from the M transmitting antennas to the N receiving antennas 1301 and the channel phase shift parameters from the M transmitting antennas to the N receiving antennas 1301, signal compensation for the data signals arrived at the N receiving antennas 1301 that are sent on the first data symbol by the M transmitting antennas.

In the embodiment of the present disclosure, the receiver 1300 determines the signal compensation of the data signals according to the channel estimation parameters from the transmitting antennas of the remote transmitter to the receiving antennas of the receiver and the channel phase shift parameters of the transmitting antennas of the remote transmitter on the first data symbol, which can improve demodulation accuracy of transmitted data to a certain extent.

Optionally, a subcarrier set for sending a first pilot signal of the $m^{th}$ transmitting antenna in the M transmitting antennas is equal to a set of subcarriers of the $m^{th}$ transmitting antenna, where $\forall m=\{1,\ldots,M\}$.

Optionally, as one embodiment, the N receiving antennas are coherent, and the M transmitting antennas are coherent.

Optionally, in an embodiment where both the receiver and the transmitter are coherent, in a process of determining the channel phase shift parameters from the M transmitting antennas to the N receiving antennas 1301 according to signals arrived at the N receiving antennas 1301 which come from the second pilot signals sent on the first data symbol by the M transmitting antennas, the determining unit 1302 is specifically configured to determine first channel phase shift parameters according to a signal arrived at the N receiving antennas 1301 which comes from a second pilot signal sent on the first data symbol by the mth transmitting antenna in the M transmitting antennas, wherein the first channel phase shift parameters are channel phase shift parameters from the $m^{th}$ transmitting antenna in the M transmitting antennas to the N receiving antennas 1301, where $\forall m=\{1,\ldots,M\}$.

Further, in a process of determining, according to the signal arrived at the N receiving antennas 1301 which comes from the second pilot signal sent on the first data symbol by the mth transmitting antenna in the M transmitting antennas, channel phase shift parameters from the $m^{th}$ transmitting antenna in the M transmitting antennas to the N receiving antennas 1301, the determining unit 1302 is specifically configured to: if there is more than one subcarrier on the first data symbol for sending the second pilot signal, determine, according to the signal arrived at the N receiving antennas 1301 which comes from the second pilot signal sent on the first data symbol by the $m^{th}$ transmitting antenna in the M transmitting antennas, multiple groups of channel phase shift parameters from the $m^{th}$ transmitting antenna in the M transmitting antennas to the N receiving antennas 1301, and determine average values of the multiple groups of channel phase shift parameters as the channel phase shift parameters from the $m^{th}$ transmitting antenna in the M transmitting antennas to the N receiving antennas 1301.

In this case, please refer to formula (24) to formula (26) for the method for the determining unit 1302 to determine the channel estimation parameters and the channel phase shift parameters, as well as determining the signal compensation according to the channel estimation parameters and the channel phase shift parameters, which will not be repeated redundantly herein in the embodiment of the present disclosure.

Optionally, as another embodiment, the N receiving antennas 1301 are incoherent, and/or the M transmitting antennas are incoherent.

Optionally, in an embodiment where the receiver and/or the transmitter is incoherent, in a process of determining the channel phase shift parameters from the M transmitting antennas to the N receiving antennas 1301 according to the pilot signals arrived at the N receiving antennas 1301 which come from the second pilot signals sent on the first data symbol by the M transmitting antennas, the determining unit 1302 is specifically configured to determine the channel phase shift parameters from the M transmitting antennas to the N receiving antennas 1301 according to all of pilot signals arrived at the N receiving antennas 1301 which come from the second pilot signals sent on the first data symbol by the M transmitting antennas, where a quantity of pilot subcarriers where all of the pilot signals are located is not smaller than M.

In this case, please refer to formula (27) to formula (31) for the method for the determining unit 1302 to determine the channel estimation parameters and the channel phase shift parameters, as well as determining the signal compensation according to the channel estimation parameters and the channel phase shift parameters, which will not be repeated redundantly herein in the embodiment of the present disclosure.

Optionally, in an embodiment where the receiver and/or the transmitter is incoherent, in a process of determining the channel phase shift parameters from the M transmitting antennas to the N receiving antennas 1301 according to pilot signals arrived at the N receiving antennas 1301 which come from the second pilot signals sent on the first data symbol by the M transmitting antennas, the determining unit 1302 is specifically configured to determine, according to at least one group of pilot signals arrived at the $n^{th}$ receiving antenna in the N receiving antennas 1301 which come from the second pilot signals sent on the first data symbol by the M transmitting antennas, the channel phase shift parameters from the M transmitting antennas to the $n^{th}$ receiving antenna in the N receiving antennas 1301, wherein each one of the at least one group of pilot signals contains pilot signals received on J numbers of subcarriers by the N receiving antennas 1301, and a value of J is not smaller than M.

In this case, please refer to formula (32) to formula (35) for the method for the determining unit 1302 to determine the channel estimation parameters and the channel phase shift parameters, as well as determining the signal compensation according to the channel estimation parameters and the channel phase shift parameters, which will not be repeated redundantly herein in the embodiment of the present disclosure.

Further, in a process of determining, according to at least one group of pilot signals arrived at the $n^{th}$ receiving antenna in the N receiving antennas 1301 which come from the second pilot signals sent on the first data symbol by the M transmitting antennas, the channel phase shift parameters from the M transmitting antennas to the $n^{th}$ receiving antenna in the N receiving antennas 1301, the determining unit 1302 is specifically configured to determine multiple groups of channel phase shift parameters from the M transmitting antennas to the $n^{th}$ receiving antenna in the N receiving antennas 1301 according to multiple groups of pilot signals arrived at the $n^{th}$ receiving antenna in the N receiving antennas 1301 which come from the second pilot signals sent on the first data symbol by the M transmitting antennas, and determine average values of channel phase shift parameters in the multiple groups of channel phase shift parameters, that are corresponding to a channel phase shift parameter from the $m^{th}$ transmitting antenna in the M transmitting antennas to the $n^{th}$ receiving antenna in the N receiving antennas 1301, as the channel phase shift parameters from the $m^{th}$ transmitting antenna in the M transmitting antennas to the $n^{th}$ receiving antenna in the N receiving antennas 1301.

Optionally, any two adjacent measurement signals of one of the plurality of channel estimation preamble signals are isolated by at least one void subcarrier.

In addition, the receiver 1300 may further execute the method in FIG. 10, and has the functions of the receiver in the embodiment as shown in FIG. 10 and in the embodiments one to six, which will not be repeated redundantly herein in the embodiment of the present disclosure.

Figure 14:
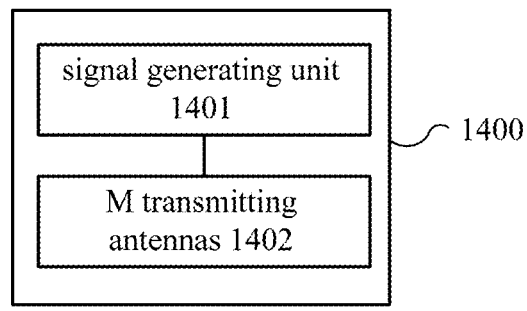
FIG. 14 is a schematic diagram of a structure of a transmitter in an embodiment of the present disclosure.

FIG. 14 is a schematic diagram of a structure of a transmitter 1400 in an embodiment of the present disclosure. The transmitter 1400 may include a signal generating unit 1401 and M transmitting antennas 1402.

The signal generating unit 1401 is configured to generate a plurality of channel estimation preamble signals.

The plurality of channel estimation preamble signals contain first pilot signals of the M transmitting antennas 1402, where M and N are integers larger than 1. The first pilot signals in the plurality of channel estimation preamble signals are used by a remote receiver for determining channel estimation parameters from the M transmitting antennas 1402 to the N receiving antennas.

The M transmitting antennas 1402 are configured to send the plurality of channel estimation preamble signals to N receiving antennas of the remote receiver.

Each one of the plurality of channel estimation preamble signals is separately transmitted by one transmitting antenna in the M transmitting antennas 1402.

The signal generating unit 1401 is further configured to generate data signals and second pilot signals.

The M transmitting antennas 1402 are further configured to send the data signals and the second pilot signals on a data symbol.

The second pilot signals are used by the remote receiver for determining channel phase shift parameters from the M transmitting antennas 1402 to the N receiving antennas, and further determining signal compensation of the data signals according to the channel estimation parameters and the channel phase shift parameters.

In the embodiment of the present disclosure, the transmitter 1400 sends the channel estimation preamble signals to multiple receiving antennas via multiple transmitting antennas and sends the data signals and the pilot signals on the data symbol, such that the receiver is able to determine the channel estimation parameters and the channel phase shift parameters from the transmitting antennas to the receiving antennas according to the pilot signals in the channel estimation preamble signals and the pilot signals on the data symbol, and further to determine the signal compensation of the data signals on the data symbol.

Optionally, any two adjacent measurement signals of one of the plurality of channel estimation preamble signals are isolated by at least one void subcarrier.

Optionally, there is one or more subcarriers on the data symbol for sending the second pilot signals.

Optionally, the M transmitting antennas of the transmitter are coherent or incoherent.

In addition, the transmitter 1400 may further execute the method in FIG. 12, and has the functions of the transmitter 1400 in the embodiment in FIG. 12 and in the embodiments one to six, which will not be repeated redundantly herein in the embodiment of the present disclosure.

Figure 15:
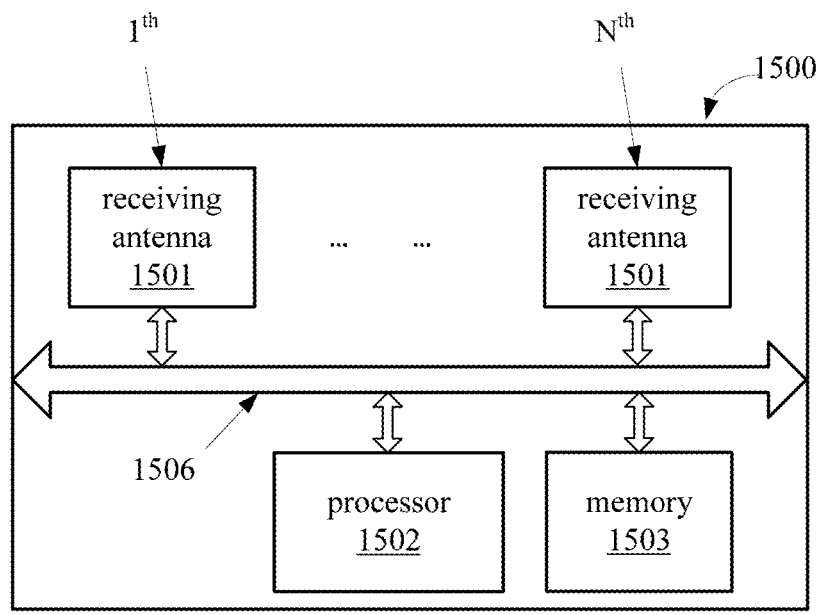
FIG. 15 is a schematic diagram of another structure of a receiver in an embodiment of the present disclosure.

FIG. 15 is a schematic diagram of a structure of a receiver 1500 in an embodiment of the present disclosure. The receiver 1500 may include a processor 1502, a memory 1503 and N receiving antennas 1501.

The processor 1502 may receive, via the N receiving antennas 1501, a plurality of channel estimation preamble signals sent by M transmitting antennas of a remote transmitter .

The plurality of channel estimation preamble signals contain first pilot signals of the M transmitting antennas, where M and N are integers larger than 1.

The processor 1502 may further determine channel estimation parameters from the M transmitting antennas to the N receiving antennas 1501 according to the first pilot signals of the M transmitting antennas contained in the plurality of channel estimation preamble signals.

The processor 1502 may further receive data signals and second pilot signals sent on a first data symbol by the M transmitting antennas 1501.

The processor 1502 may further determine channel phase shift parameters from the M transmitting antennas to the N receiving antennas 1501 according to signals arrived at the N receiving antennas 1501 which come from the second pilot signals sent on the first data symbol by the M transmitting antennas.

The processor 1502 may further determine, according to the channel estimation parameters from the M transmitting antennas to the N receiving antennas 1501 and the channel phase shift parameters from the M transmitting antennas to the N receiving antennas 1501, signal compensation for the data signals arrived at the N receiving antennas 1501 which are sent on the first data symbol by the M transmitting antennas.

The memory 1503 may store an instruction for making the processor 1502 to execute the above-mentioned operations.

The processor 1502 controls an operation of the receiver 1500, and the processor 1502 may also be referred to as a CPU (central processing unit). The memory 1503 may include a read-only memory and a random access memory and provide instructions and data to the processor 1502. A part of the memory 1503 may further include a nonvolatile random access memory (NVRAM). Components of the receiver 1500 are coupled together by a bus system 1506, where besides a data bus, the bus system 1506 may further include a power source bus, a control bus and a status signal bus or the like. But for clarity, the various buses in the figure are marked as the bus system 1506.

The method disclosed in the above-mentioned embodiment of the present disclosure may be applied to the processor 1502 or may be implemented by the processor 1502. The processor 1502 may be an integrated circuit chip with a signal processing capability. In an implementation process, the steps of the above-mentioned method may be completed by an integrated logic circuit of hardware or a software instruction in the processor 1502. The above-mentioned processor 1502 may be a general-purpose processor, a digital signal processor (DSP), an application-specific integrated circuit (ASIC), a field-programmable gate array (FPGA) or other programmable logic device, a discrete gate or a transistor logic device, and a discrete hardware component, and may implement or execute the methods, the steps and the logic block diagrams disclosed in the embodiment of the present disclosure. The general-purpose processor may be a microprocessor, or the processor may be any conventional processor or the like. The steps of the method disclosed in the embodiment of the present disclosure may be directly executed and completed by a hardware decoding processor, or is executed and completed by a combination of hardware and software modules in the decoding processor. The software module may be located in a mature storage medium in the art, such as a random access memory, a flash memory, a read-only memory, a programmable read-only memory or an electrically erasable programmable memory, a register, etc. The storage medium is located in the memory 1503, and the processor 1502 reads information in the memory 1503 and completes the steps of the above-mentioned method in combination with the hardware thereof.

In the embodiment of the present disclosure, the receiver 1500 determines the signal compensation of the data signals according to the channel estimation parameters from the transmitting antennas of the remote transmitter to the receiving antennas of the receiver and the channel phase shift parameters of the transmitting antennas of the remote transmitter on a first data symbol, which can improve demodulation accuracy of data transmission to a certain extent.

Optionally, a subcarrier set for sending a first pilot signal of the $m^{th}$ transmitting antenna in the M transmitting antennas is equal to a set of subcarriers of the $m^{th}$ transmitting antenna, where $\forall m=\{1,\ldots,M\}$.

Optionally, as one embodiment, the N receiving antennas are coherent, and the M transmitting antennas are coherent.

Optionally, in an embodiment where both the receiver and the transmitter are coherent, in a process of determining channel phase shift parameters from the M transmitting antennas to the N receiving antennas 1501 according to signals arrived at the N receiving antennas 1501 which come from the second pilot signals sent on the first data symbol by the M transmitting antennas, the processor 1502 is specifically configured to determine first channel phase shift parameters according to a signal arrived at the N receiving antennas 1501 which comes from a second pilot signal sent on the first data symbol by the mth transmitting antenna in the M transmitting antennas, wherein the first channel phase shift parameters are channel phase shift parameters from the $m^{th}$ transmitting antenna in the M transmitting antennas to the N receiving antennas 1501, where $\forall m=\{1,\ldots,M\}$.

Further, in a process of determining, according to the signal arrived at the N receiving antennas 1501 which comes from the second pilot signal sent on the first data symbol by the mth transmitting antenna in the M transmitting antennas, channel phase shift parameters from the $m^{th}$ transmitting antenna in the M transmitting antennas to the N receiving antennas 1501, the processor 1502 is specifically configured to: if there is more than one subcarrier on the first data symbol for sending the second pilot signal, determine, according to signals arrived at the N receiving antennas 1501 which come from the second pilot signals sent on a plurality of subcarriers of the first data symbol by the $m^{th}$ transmitting antenna in the M transmitting antennas, multiple groups of channel phase shift parameters from the $m^{th}$ transmitting antenna in the M transmitting antennas to the N receiving antennas 1501, and determine average values of the multiple groups of channel phase shift parameters as the channel phase shift parameters from the $m^{th}$ transmitting antenna in the M transmitting antennas to the N receiving antennas 1501.

In this case, please refer to formula (24) to formula (26) for the method for the processor 1302 to determine the channel estimation parameters and the channel phase shift parameters, as well as determining the signal compensation according to the channel estimation parameters and the channel phase shift parameters, which will not be repeated redundantly herein in the embodiment of the present disclosure.

Optionally, as another embodiment, the N receiving antennas 1501 are incoherent, and/or the M transmitting antennas are incoherent.

Optionally, in an embodiment where the receiver and/or the transmitter is incoherent, in a process of determining the channel phase shift parameters from the M transmitting antennas to the N receiving antennas 1501 according to the pilot signals arrived at the N receiving antennas 1501 which come from the second pilot signals sent on the first data symbol by the M transmitting antennas, the processor 1502 is specifically configured to determine the channel phase shift parameters from the M transmitting antennas to the N receiving antennas 1501 according to all of pilot signals arrived at the N receiving antennas 1501 which come from the second pilot signals sent on the first data symbol by the M transmitting antennas, where a quantity of pilot subcarriers where all the pilot signals are located is not smaller than M.

In this case, please refer to formula (27) to formula (31) for the method for the processor 1502 to determine the channel estimation parameters and the channel phase shift parameters, as well as determining the signal compensation according to the channel estimation parameters and the channel phase shift parameters, which will not be repeated redundantly herein in the embodiment of the present disclosure.

Optionally, in an embodiment where the receiver and/or the transmitter is incoherent, in a process of determining the channel phase shift parameters from the M transmitting antennas to the N receiving antennas 1501 according to pilot signals arrived at the N receiving antennas 1501 which come from the second pilot signals sent on the first data symbol by the M transmitting antennas, the processor 1502 is specifically configured to determine, according to at least one group of pilot signals arrived at the $n^{th}$ receiving antenna in the N receiving antennas 1501 which come from the second pilot signals sent on the first data symbol by the M transmitting antennas, the channel phase shift parameters from the M transmitting antennas to the $n^{th}$ receiving antenna in the N receiving antennas 1501, wherein each one of the at least one group of pilot signals contains pilot signals received on J numbers of subcarriers by the N receiving antennas 1501, and a value of J is not smaller than M.

In this case, please refer to formula (32) to formula (35) for the method for the processor 1502 to determine the channel estimation parameters and the channel phase shift parameters, as well as determining the signal compensation according to the channel estimation parameters and the channel phase shift parameters, which will not be repeated redundantly herein in the embodiment of the present disclosure.

Further, in a process of determining, according to at least one group of pilot signals arrived at the $n^{th}$ receiving antenna in the N receiving antennas 1301 which come from the second pilot signals sent on the first data symbol by the M transmitting antennas, the channel phase shift parameters from the M transmitting antennas to the $n^{th}$ receiving antenna in the N receiving antennas 1501, the processor 1502 is specifically configured to determine multiple groups of channel phase shift parameters from the M transmitting antennas to the $n^{th}$ receiving antenna in the N receiving antennas 1501 according to multiple groups of pilot signals arrived at the $n^{th}$ receiving antenna in the N receiving antennas 1501 which come from the second pilot signals sent on the first data symbol by the M transmitting antennas, and determine average values of channel phase shift parameters in the multiple groups of channel phase shift parameters, that are corresponding to a channel phase shift parameter from the $n^{th}$ transmitting antenna in the M transmitting antennas to the $n^{th}$ receiving antenna in the N receiving antennas 1501, as the channel phase shift parameters from the $m^{th}$ transmitting antenna in the M transmitting antennas to the $n^{th}$ receiving antenna in the N receiving antennas 1501.

Optionally, any two adjacent measurement signals of one of the plurality of channel estimation preamble signals are isolated by at least one void subcarrier.

In addition, the receiver 1500 may further execute the method in FIG. 10, and has the functions of the receiver in the embodiment as shown in FIG. 10 and in the embodiments one to six, which will not be repeated redundantly herein in the embodiment of the present disclosure.

Figure 16:
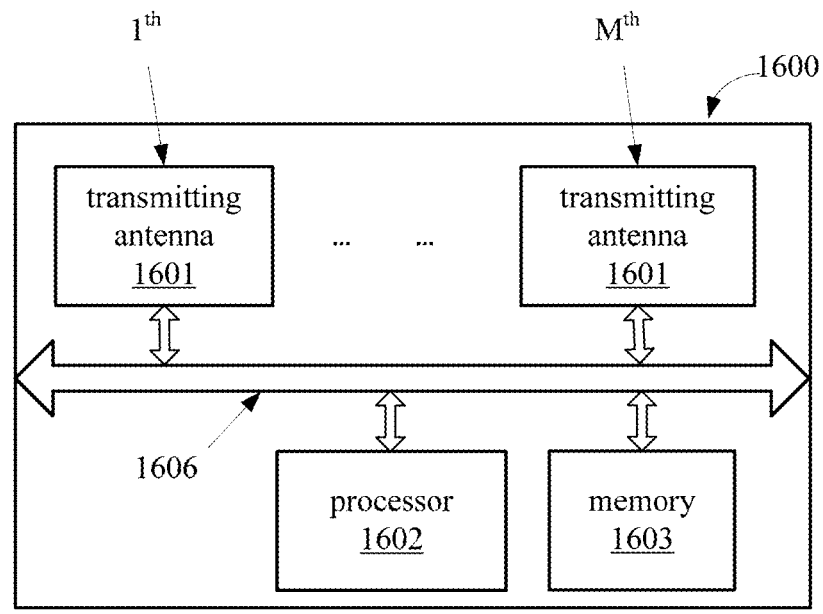
FIG. 16 is a schematic diagram of another structure of a transmitter in an embodiment of the present disclosure.

FIG. 16 is a schematic diagram of a structure of a transmitter 1600 in an embodiment of the present disclosure. The transmitter 1600 may include a processor 1602, M transmitting antennas 1601 and a memory 1603.

The processor 1602 may be configured to generate a plurality of channel estimation preamble signals, and send, via the M transmitting antennas 1601, the plurality of channel estimation preamble signals to N receiving antennas of a remote receiver.

The plurality of channel estimation preamble signals contain first pilot signals of the M transmitting antennas 1601, where M and N are integers larger than 1. The first pilot signals in the plurality of channel estimation preamble signals are used by a remote receiver for determining channel estimation parameters from the M transmitting antennas 1601 to the N receiving antennas, and each of the plurality of channel estimation preamble signals is separately transmitted by one transmitting antenna of the M transmitting antennas 1601.

The processor 1602 may be further configured to generate data signals and second pilot signals, and send the data signals and the second pilot signals on a data symbol via the M transmitting antennas 1601.

The second pilot signals are used by the remote receiver for determining channel phase shift parameters from the M transmitting antennas 1601 to the N receiving antennas, and further determining signal compensation of the data signals according to the channel estimation parameters and the channel phase shift parameters.

The memory 1603 may store an instruction for making the processor 1602 to execute the above-mentioned operations.

The processor 1602 controls an operation of the transmitter 1600, and the processor 1602 can also be referred to as a CPU (Central Processing Unit).The memory 1603 may include a read-only memory and a random access memory, and provide instructions and data to the processor 1602. A part of the memory 1603 may further include a nonvolatile random access memory (NVRAM). Components of the transmitter 1600 are coupled together by a bus system 1606, wherein besides a data bus, the bus system 1606 may further include a power source bus, a control bus and a status signal bus or the like. But for clarity, the various buses in the figure are marked as the bus system 1606.

The method disclosed in the above-mentioned embodiment of the present disclosure may he applied to the processor 1602 or may be implemented by the processor 1602. The processor 1602 may be an integrated circuit chip with a signal processing capacity. In an implementation process, the steps of the above-mentioned method may be completed by an integrated logic circuit of hardware or a software instruction in the processor 1602. The above-mentioned processor 1602 may be a general-purpose processor, a digital signal processor (DSP), an application-specific integrated circuit (ASIC), a field-programmable gate array (FPGA) or other programmable logic device, a discrete gate or a transistor logic device, and a discrete hardware component, and may implement or execute the methods, the steps and the logic block diagrams disclosed in the embodiment of the present disclosure. The general-purpose processor may be a microprocessor, or the processor may be any conventional processor or the like. The steps of the method disclosed in the embodiment of the present disclosure may be directly executed and completed by a hardware decoding processor, or is executed and completed by a combination of hardware and software modules in the decoding processor.

The software module may be located in a mature storage medium in the art, such as a random access memory, a flash memory, a read-only memory, a programmable read-only memory or an electrically erasable programmable memory, a register, etc. The storage medium is located in the memory 1603, and the processor 1602 reads information in the memory 1603 and completes the steps of the above-mentioned method in combination with the hardware thereof.

In the embodiment of the present disclosure, the transmitter 1600 sends the channel estimation preamble signals to multiple receiving antennas via multiple transmitting antennas and sends the data signals and the pilot signals on the data symbol, such that the receiver is able to determine the channel estimation parameters and the channel phase shift parameters from the transmitting antennas to the receiving antennas according to the pilot signals in the channel estimation preamble signals and the pilot signals on the data symbol, and further to determine the signal compensation of the data signals on the data symbol.

Optionally, any two adjacent measurement signals of one of the plurality of channel estimation preamble signals are isolated by at least one void subcarrier.

Optionally, there is one or more subcarriers on the data symbol for sending the second pilot signals.

Optionally, the M transmitting antennas of the transmitter are coherent or incoherent.

In addition, the transmitter 1600 may further execute the method in FIG. 12, and has the functions of the transmitter 1600 in the embodiment in FIG. 12 and in the embodiments one to six, which will not be repeated redundantly herein in the embodiment of the present disclosure.

Figure 17:
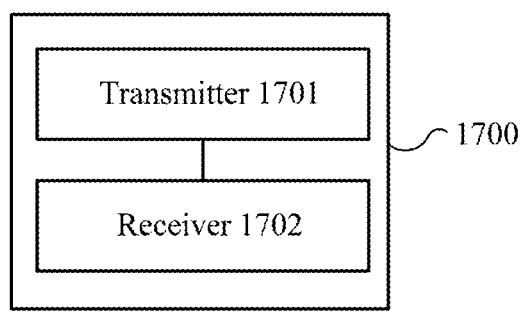
FIG. 17 is a schematic diagram of a structure of an MIMO-OFDM system in an embodiment of the present disclosure.

FIG. 17 is a schematic diagram of a structure of an MIMO-OFDM system 1700 in an embodiment of the present disclosure. The MIMO-OFDM system 1700 may include a transmitter 1701 and a receiver 1702.

The receiver 1702 may he the receiver 1300 in the embodiment shown in FIG. 13 or the receiver 1500 in the embodiment shown in FIG. 15, and may implement the functions of the receiver in embodiments one to six of the present disclosure. The transmitter 1701 may be the transmitter 1400 in the embodiment shown in FIG. 14 or the transmitter 1600 in the embodiment shown in FIG. 16, and may implement the functions of the transmitter in the embodiments one to six of the present disclosure, which will not be repeated redundantly herein.

In the embodiment of the present disclosure, the MIMO-OFDM system 1700 determines the channel estimation parameters and the channel phase shift parameters according to the pilot signals of the remote transmitter, and further to determine the signal compensation of the receiving end, thereby improving accuracy of an estimated value of transmitted data.

Those of ordinary skill in the art may be aware that, units and algorithm steps of the examples described in the embodiments disclosed in the present disclosure may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for every specific application, but this implementation should not be considered to be beyond the scope of the present disclosure.

Those skilled in the art to which the present disclosure pertains may clearly understand that, for convenience and simplicity of description, corresponding processes in the foregoing method embodiments may be referred to for specific working processes of the system, the apparatus and the units described above, which will not be repeated redundantly herein.

In several embodiments provided in the present application, it should be understood that, the disclosed system, apparatus and method may be implemented in other manner. For example, the apparatus embodiments described above are merely exemplary, e.g., partition of the units is only a logic functionality partition, and other partitioning manners may be used in a practical implementation. For example, a plurality of units or components may be combined or integrated into another system, or some features may be omitted or not implemented. From another point of view, the displayed or discussed mutual coupling or direct coupling or communication connection may be indirect coupling or communication connection of apparatuses or units through some interfaces, and may be in electrical, mechanical or other form.

The units described as separate components may be separated physically or not, the components displayed as units may he physical units or not, namely, may he located in one place, or may be distributed in a plurality of network units. A part of, or all of, the units may be selected to implement the purpose of the technical solutions in the embodiments according to actual needs.

In addition, the functional units in the embodiments of the present disclosure may be integrated in a processing unit, or the units separately exist physically, or two or more units are integrated in one unit.

If the function is implemented in the form of a software functional unit and is sold or used as an independent product, it may be stored in a computer readable storage medium. Based on such understanding, essence of the technical solutions of the present disclosure, or a part of the technical solution contributing to the prior art, or a part of the technical solutions, may be implemented in the form of a software product. The computer software product is stored in a storage medium, and includes a plurality of instructions for enabling a computer device (may be a personnel computer, a server, or a network device or the like) or a processor to execute all or a part of the steps of the methods in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific embodiments of the present disclosure, rather than limiting the protection scope of the present disclosure. Any skilled one familiar with this art could readily think of variations or substitutions within the disclosed technical scope of the present disclosure, and these variations or substitutions shall fall into the protection scope of the present disclosure. Accordingly, the protection scope of the claims should prevail over the protection scope of the present disclosure.

The invention claimed is:

1. A method for signal compensation, comprising:
receiving, by a receiver via N receiving antennas, a plurality of channel estimation preamble signals sent by M transmitting antennas of a remote transmitter, wherein the plurality of channel estimation preamble signals contain measurement signals of the M transmitting antennas of the remote transmitter, wherein every two adjacent measurement signals of one of the plurality of channel estimation preamble signals are isolated by at least one void subcarrier, and wherein a same number of void subcarriers are included between every two adjacent measurement signals;

determining, by the receiver, channel estimation parameters from the M transmitting antennas to the N receiving antennas according to the plurality of channel estimation preamble signals, wherein M and N are integers larger than 1, wherein the plurality of channel estimation preamble signals comprise first pilot signals of the M transmitting antennas;

receiving, by the receiver, data signals and second pilot signals sent on a first data symbol by the M transmitting antennas;

determining, by the receiver, channel phase shift parameters from the M transmitting antennas to the N receiving antennas; and determining, by the receiver, signal compensation for the data signals arrived at the N receiving antennas that are sent on the first data symbol by the M transmitting antennas according to the channel estimation parameters and the channel phase shift parameters, wherein the determining the signal compensation is performed using the following formula:

$$\begin{bmatrix} \hat{x}_1^k \\ \vdots \\ \hat{x}_M^k \end{bmatrix} = [[H_\xi^d]^\dagger H_\xi^d]^{-1}[H_\xi^d]^\dagger \begin{bmatrix} y_1^k(l) \\ \vdots \\ y_N^k(l) \end{bmatrix}$$

wherein $\hat{x}_m^k$ represents a data signal transmitted on the $k^{th}$ subcarrier of the $l^{th}$ data symbol by the $m^{th}$ transmitting antenna in the M transmitting antennas, $y_n^k(l)$ represents a signal arrived at the $n^{th}$ receiving antenna of the receiver s from a data signal transmitted on the $k^{th}$ subcarrier of the $l^{th}$ data symbol by the M transmitting antennas, $\forall m=\{1,\ldots,M\}$, $\forall n=\{1,\ldots,N\}$, $[\mathbf{H}_\xi^k]^\dagger$ represents a conjugate matrix of $\mathbf{H}_\xi^k$, $$H_\xi^k = \begin{bmatrix} \hat{H}_{11}^k e^{j\xi_{11}} & \cdots & \hat{H}_{1M}^k e^{j\xi_{1M}} \\ \vdots & \vdots & \vdots \\ \hat{H}_{N1}^k e^{j\xi_{N1}} & \cdots & \hat{H}_{NM}^k e^{j\xi_{NM}} \end{bmatrix},$$

$\hat{\mathbf{H}}_{nm}^k$ in $\mathbf{H}_\xi^k$ represents a channel estimation parameter on the $k^{th}$ subcarrier between the $m^{th}$ transmitting antenna of the remote transmitter and the $n^{th}$ receiving antenna of the receiver, $\hat{\mathbf{H}}_{nm}^k = y_n^k(t)/s^k$, $\forall n=\{1,\ldots,N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver s from a pilot signal on the $k^{th}$ subcarrier in the $t^{th}$ channel estimation preamble signal of the remote transmitter, $$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix}$$

represents channel phase shift parameters for signals arrived at the N receiving antennas that are sent on the $l^{th}$ data symbol by the M transmitting antennas, and is expressed by the following formula:

$$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix} = \left[\begin{bmatrix} \tilde{H}^{P_1} \\ \vdots \\ \tilde{H}^{P_{|p|}} \end{bmatrix}^\dagger \begin{bmatrix} \tilde{H}^{P_1} \\ \vdots \\ \tilde{H}^{P_{|p|}} \end{bmatrix}\right]^{-1} \begin{bmatrix} \tilde{H}^{P_1} \\ \vdots \\ \tilde{H}^{P_{|p|}} \end{bmatrix}^\dagger \begin{bmatrix} y_1^{P_1}(l) \\ \vdots \\ y_N^{P_1}(l) \\ y_1^{P_2}(l) \\ \vdots \\ y_N^{P_{|p|}}(l) \end{bmatrix}$$

wherein $y_n^P(l)$ represents a pilot signal arrived at the N receiving antennas s from a pilot signal transmitted on a pilot subcarrier p of the $l^{th}$ data symbol by the M transmitting antennas, p represents any pilot subcarrier in a pilot subcarrier set $\{p_1,\ldots p_{|p|}\}$ of the $l^{th}$ data symbol, and $\hat{\mathbf{H}}^p$ is expressed by the following formula:

$$\tilde{H}^P = \begin{bmatrix} \hat{H}_{11}^P s_1^P & \cdots & \hat{H}_{1M}^P s_M^P & 0 & \cdots & 0 & 0 & \cdots & 0 \\ 0 & \cdots & 0 & \hat{H}_{21}^P s_1^P & \cdots & \hat{H}_{2M}^P s_M^P & \vdots & \cdots & \vdots \\ \vdots & \cdots & \vdots & \vdots & \vdots & \vdots & 0 & \cdots & 0 \\ 0 & \cdots & 0 & 0 & \cdots & 0 & \hat{H}_{N1}^P s_1^P & \cdots & \hat{H}_{NM}^P s_M^P \end{bmatrix}.$$

2. A receiver, comprising:

N receiving antennas, configured to receive a plurality of channel estimation preamble signals sent by M transmitting antennas of a remote transmitter, wherein the plurality of channel estimation preamble signals contain measurement signals of the M transmitting antennas of the remote transmitter, wherein every two adjacent measurement signals of one of the plurality of channel estimation preamble signals are isolated by at least one void subcarrier, and wherein a same number of void subcarriers are included between every two adjacent measurement signals; and a determining unit, configured to determine channel estimation parameters from the M transmitting antennas to the N receiving antennas according to the plurality of channel estimation preamble signals, M and N are integers larger than 1, wherein the plurality of channel estimation preamble signals comprise first pilot signals of the M transmitting antennas;

wherein the N receiving antennas are further configured to receive data signals and second pilot signals sent on a first data symbol by the M transmitting antennas; and wherein the determining unit is further configured to determine channel phase shift parameters from the M transmitting antennas to the N receiving antennas, and determine signal compensation for the data signals arrived at the N receiving antennas that are sent on the first data symbol by the M transmitting antennas according to the channel estimation parameters and the channel phase shift parameters, wherein the determining unit determines the signal compensation using the following formula:

$$\begin{bmatrix} \hat{x}_1^k \\ \vdots \\ \hat{x}_M^k \end{bmatrix} = [[H_\xi^k]^\dagger H_\xi^k]^{-1}[H_\xi^k]^\dagger \begin{bmatrix} y_1^k(l) \\ \vdots \\ y_N^k(l) \end{bmatrix}$$

wherein $\hat{x}_m^k$ represents a data signal transmitted on the $k^{th}$ subcarrier of the $l^{th}$ data symbol by the $m^{th}$ transmitting antenna in the M transmitting antennas, $y_n^k(l)$ represents a signal arrived at the $n^{th}$ receiving antenna of the receiver s from a data signal transmitted on the $k^{th}$ subcarrier of the $l^{th}$ data symbol by the M transmitting antennas, $\forall m=\{1,\ldots,M\}$, $\forall n=\{1,\ldots,N\}$, $[\hat{\mathbf{H}}_\xi^k]^\dagger$ represents a conjugate matrix of $\mathbf{H}_\xi^k$, $$H_\xi^k = \begin{bmatrix} \hat{H}_{11}^k e^{j\xi_{11}} & \cdots & \hat{H}_{1M}^k e^{j\xi_{1M}} \\ \vdots & \vdots & \vdots \\ \hat{H}_{N1}^k e^{j\xi_{N1}} & \cdots & \hat{H}_{NM}^k e^{j\xi_{NM}} \end{bmatrix},$$

$\hat{\mathbf{H}}_{nm}^k$ in $\mathbf{H}_\xi^k$ represent a channel estimation parameter on the $k^{th}$ subcarrier between the $m^{th}$ transmitting antenna of the remote transmitter and the $n^{th}$ receiving antenna of the receiver, $\hat{\mathbf{H}}_{nm}^k = y_n^k(t)/s^k$, $\forall n=\{1,\ldots,N\}$, $k \in K$, K represents a subcarrier set of the $m^{th}$ transmitting antenna of the remote transmitter for transmitting the channel estimation preamble signal, $s^k$ represents a pilot signal of the $k^{th}$ subcarrier in the plurality of channel estimation preamble signals, $y_n^k(t)$ represents a pilot signal arrived at the $n^{th}$ receiving antenna of the receiver s from a pilot signal on the $k^{th}$ subcarrier in the $t^{th}$ channel estimation preamble signal of the remote transmitter, $$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix}$$

represents channel phase shift parameters for signals arrived at the N receiving antennas that are sent on the $l^{th}$ data symbol by the M transmitting antennas, and is expressed by the following formula:

$$\begin{bmatrix} e^{j\xi_{11}} & \cdots & e^{j\xi_{1M}} \\ \vdots & \vdots & \vdots \\ e^{j\xi_{N1}} & \cdots & e^{j\xi_{NM}} \end{bmatrix} = \begin{bmatrix} \begin{bmatrix} \tilde{H}^{p_1} \\ \vdots \\ \tilde{H}^{p_{|p|}} \end{bmatrix}^\dagger \begin{bmatrix} \tilde{H}^{p_1} \\ \vdots \\ \tilde{H}^{p_{|p|}} \end{bmatrix} \end{bmatrix}^{-1} \begin{bmatrix} \tilde{H}^{p_1} \\ \vdots \\ \tilde{H}^{p_{|p|}} \end{bmatrix}^\dagger \begin{bmatrix} y_1^{p_1}(l) \\ \vdots \\ y_N^{p_1}(l) \\ y_1^{p_2}(l) \\ \vdots \\ y_N^{p_{|p|}}(l) \end{bmatrix}$$

wherein $y_n^p(l)$ represents a pilot signal arrived at the N receiving antennas s from a pilot signal transmitted on a pilot subcarrier p of the $l^{th}$ data symbol by the M transmitting antennas, p represents any pilot subcarrier in a pilot subcarrier set $\{p_1, \ldots p_{|p|}\}$ of the $l^{th}$ data symbol, and $\hat{\mathbf{H}}^p$ is expressed by the following formula:

$$\tilde{H}^p = \begin{bmatrix} \hat{H}_{11}^p s_1^p & \cdots & \hat{H}_{1M}^p s_M^p & 0 & \cdots & 0 & 0 & \cdots & 0 \\ 0 & \cdots & 0 & \hat{H}_{21}^p s_1^p & \cdots & \hat{H}_{2M}^p s_M^p & \vdots & \cdots & \vdots \\ \vdots & \cdots & \vdots & \vdots & \vdots & \vdots & 0 & \cdots & 0 \\ 0 & \cdots & 0 & 0 & \cdots & 0 & \hat{H}_{N1}^p s_1^p & \cdots & \hat{H}_{NM}^p s_M^p \end{bmatrix}.$$

\* \* \* \* \*

UNITED STATES PATENT AND TRADEMARK OFFICE
CERTIFICATE OF CORRECTION

| | | |
|---|---|---|
| PATENT NO. | : 10,148,462 B2 | Page 1 of 1 |
| APPLICATION NO. | : 15/432711 | |
| DATED | : December 4, 2018 | |
| INVENTOR(S) | : Huang Huang | |

It is certified that error appears in the above-identified patent and that said Letters Patent is hereby corrected as shown below:

In the Claims

Column 53, Line 25, Claim 1:

$$``\begin{bmatrix} \hat{x}_1^k \\ \vdots \\ \hat{x}_M^k \end{bmatrix} = [H_\xi^d]^\dagger H_\xi^d]^{-1} [H_\xi^d]^\dagger \begin{bmatrix} y_1^k(l) \\ \vdots \\ y_N^k(l) \end{bmatrix},"$$

Should read as follows:

$$--\begin{bmatrix} \hat{x}_1^k \\ \vdots \\ \hat{x}_M^k \end{bmatrix} = \left[\left[\mathbf{H}_\xi^k\right]^\dagger \mathbf{H}_\xi^k\right]^{-1} \left[\mathbf{H}_\xi^k\right]^\dagger \begin{bmatrix} y_1^k(l) \\ \vdots \\ y_N^k(l) \end{bmatrix}--$$

Signed and Sealed this
Third Day of September, 2019

Andrei Iancu
*Director of the United States Patent and Trademark Office*